United States Patent
Määttänen et al.

(10) Patent No.: US 12,369,168 B2
(45) Date of Patent: Jul. 22, 2025

(54) ACTIVATION OF TWO OR MORE TCI STATES FOR ONE OR MORE CORESETs

(71) Applicant: Telefonaktiebolaget LM Ericsson (publ), Stockholm (SE)

(72) Inventors: Helka-Liina Määttänen, Helsinki (FI); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 18/009,836

(22) PCT Filed: Jun. 11, 2021

(86) PCT No.: PCT/IB2021/055182
§ 371 (c)(1),
(2) Date: Dec. 12, 2022

(87) PCT Pub. No.: WO2021/250637
PCT Pub. Date: Dec. 16, 2021

(65) Prior Publication Data
US 2023/0224923 A1    Jul. 13, 2023

Related U.S. Application Data

(60) Provisional application No. 63/038,385, filed on Jun. 12, 2020.

(51) Int. Cl.
*H04W 72/231* (2023.01)
*H04W 72/1273* (2023.01)

(52) U.S. Cl.
CPC ..... *H04W 72/231* (2023.01); *H04W 72/1273* (2013.01)

(58) Field of Classification Search
CPC .......... H04W 72/1273; H04W 72/231
(Continued)

(56) References Cited

U.S. PATENT DOCUMENTS 9,924,502 B2    3/2018    Choi et al.
10,666,334 B2   5/2020    Xiong et al.
(Continued)

FOREIGN PATENT DOCUMENTS

CN    108352945 A    7/2018
CN    111031603 A    4/2020
(Continued)

OTHER PUBLICATIONS

Author Unknown, "Technical Specification Group Radio Access Network; NR; Requirements for support of radio resource management (Release 15)," Technical Specification 38.133, Version 15.10.0, Jun. 2020, 3GPP Organizational Partners, 1,161 pages.
(Continued)

*Primary Examiner* — Peter G Solinsky
(74) *Attorney, Agent, or Firm* — Withrow & Terranova, PLLC

(57) ABSTRACT

Systems and methods are disclosed herein for activation of two or more Transmission Configuration Indication (TCI) states for a Physical Downlink Control Channel (PDCCH) in one or more Control Resource Sets (CORESETs) in a cellular communications system. In one embodiment, a method performed by a wireless communication device for activation of multiple TCI states for a PDCCH in one or more CORESETs in a cellular communications system comprises receiving, from a network node, signaling that activates NTCI TCI states for one or more CORESETs, wherein NTCI>1. In this manner, activation of two or more TCI states for PDCCH in one or more CORESETs is enabled.

21 Claims, 15 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,601,824 B2* | 3/2023 | Hamidi-Sepehr | H04L 5/0053 |
| 2011/0235601 A1 | 9/2011 | Yoo et al. | |
| 2013/0252606 A1 | 9/2013 | Nimbalker et al. | |
| 2018/0279360 A1 | 9/2018 | Park et al. | |
| 2019/0182807 A1 | 6/2019 | Panteleev et al. | |
| 2019/0222357 A1 | 7/2019 | Huang et al. | |
| 2019/0222400 A1 | 7/2019 | Bagheri et al. | |
| 2019/0253308 A1 | 8/2019 | Huang et al. | |
| 2019/0253904 A1 | 8/2019 | Tsai et al. | |
| 2019/0305909 A1 | 10/2019 | Chien et al. | |
| 2019/0373450 A1 | 12/2019 | Zhou et al. | |
| 2020/0008235 A1 | 1/2020 | Sarkis et al. | |
| 2020/0052844 A1 | 2/2020 | Yu et al. | |
| 2020/0100154 A1 | 3/2020 | Cirik et al. | |
| 2020/0106559 A1 | 4/2020 | Vilaipornsawai et al. | |
| 2020/0145062 A1 | 5/2020 | Jung et al. | |
| 2020/0153497 A1 | 5/2020 | Tsai et al. | |
| 2020/0153572 A1 | 5/2020 | Tsai et al. | |
| 2020/0154467 A1 | 5/2020 | Gong et al. | |
| 2020/0314858 A1* | 10/2020 | Xu | H04W 72/21 |
| 2020/0351896 A1* | 11/2020 | Taherzadeh Boroujeni | H04L 5/0091 |
| 2021/0028843 A1 | 1/2021 | Zhou et al. | |
| 2021/0058971 A1 | 2/2021 | Molavianjazi et al. | |
| 2021/0119688 A1 | 4/2021 | Enescu et al. | |
| 2021/0144744 A1* | 5/2021 | Zhou | H04W 72/23 |
| 2021/0184738 A1* | 6/2021 | Bai | H04L 5/0048 |
| 2021/0195600 A1 | 6/2021 | Khoshnevisan et al. | |
| 2021/0226820 A1 | 7/2021 | Khoshnevisan et al. | |
| 2021/0227418 A1 | 7/2021 | Hwang et al. | |
| 2021/0227525 A1 | 7/2021 | Khoshnevisan et al. | |
| 2021/0258928 A1 | 8/2021 | Khoshnevisan et al. | |
| 2021/0320753 A1 | 10/2021 | Shimezawa et al. | |
| 2021/0321446 A1 | 10/2021 | Lee et al. | |
| 2021/0329611 A1 | 10/2021 | Karjalainen et al. | |
| 2023/0023041 A1 | 1/2023 | Yi et al. | |
| 2023/0040433 A1 | 2/2023 | Zhang et al. | |
| 2023/0106244 A1* | 4/2023 | Yu | H04B 7/0695 370/329 |
| 2023/0198721 A1 | 6/2023 | Gao et al. | |
| 2023/0209561 A1 | 6/2023 | Matsumura et al. | |
| 2024/0031067 A1 | 1/2024 | Gao et al. | |

FOREIGN PATENT DOCUMENTS

| | | |
|---|---|---|
| CN | 111106914 A | 5/2020 |
| CN | 111148239 A | 5/2020 |
| EP | 3809650 A1 | 4/2021 |
| WO | 2018045092 A1 | 3/2018 |
| WO | 2018228487 A1 | 12/2018 |
| WO | 2019139955 A1 | 7/2019 |
| WO | 201924422 A1 | 12/2019 |
| WO | 2019244223 A1 | 12/2019 |
| WO | 2020033549 A1 | 2/2020 |
| WO | 2020033647 A1 | 2/2020 |
| WO | 2020054036 A1 | 3/2020 |
| WO | 2020064512 A1 | 4/2020 |
| WO | 2020080916 A1 | 4/2020 |
| WO | 2020098737 A1 | 5/2020 |
| WO | 2020153809 A1 | 7/2020 |
| WO | 2021156790 A1 | 8/2021 |
| WO | 2021234678 A2 | 11/2021 |

OTHER PUBLICATIONS

Ericsson, "R4-2007382: Transmission scheme in NR PDSCH demodulation requirements for HST," 3GPP TSG-RAN WG4 Meeting #95-e, May 25-Jun. 5, 2020, Electronic Meeting, 3 pages.

Huawei, et al., "R4-1912745: Further discussion on scenarios and transmission schemes for NR Rel-16 HST," 3GPP TSG-RAN WG4 Meeting #92Bis, Oct. 14-18, 2019, Chongqing, China, 4 pages.

Xiaomi, "R1-1902865: Enhancements on Multi-TRP/Panel Transmission," 3GPP TSG RAN WG1 #96, Feb. 25-Mar. 1, 2019, Athens, Greece, 4 pages.

International Search Report and Written Opinion for International Patent Application No. PCT/IB2021/057104, mailed Oct. 26, 2021, 14 pages.

Written Opinion for International Patent Application No. PCT/IB2021/057104, mailed Aug. 31, 2022, 6 pages.

International Preliminary Report on Patentability for International Patent Application No. PCT/IB2021/057104, mailed Nov. 22, 2022, 18 pages.

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.

Author Unknown, "Technical Specification Group Radio Access Network; NR; Physical channels and modulation (Release 16)," Technical Specification 38.211, Version 16.0.0, Dec. 2019, 3GPP Organizational Partners, 129 pages.

Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.

Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.

Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.

Author Unknown, "Technical Specification Group Radio Access Network; NR; Physical layer procedures for control (Release 15)," Technical Specification 38.213, Version 1.0.2, Oct. 2017, 3GPP Organizational Partners, 23 pages.

Author Unknown, "Technical Specification Group Radio Access Network; NR; Physical layer procedures for control (Release 15)," Technical Specification 38.213, Version 15.4.0, Dec. 2018, 3GPP Organizational Partners, 104 pages.

Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.

Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.

Author Unknown, "Technical Specification Group Radio Access Network; NR: Medium Access Control (MAC) protocol specification (Release 16)," Technical Specification 38.321, Version 16.0.0, Mar. 2020, 3GPP Organizational Partners, 141 pages.

Author Unknown, "Technical Specification Group Radio Access Network; NR; Radio Resource Control (RRC) protocol specification (Release 15)," Technical Specification 38.331, Version 15.1.0, Mar. 2018, 3GPP Organizational Partners, 268 pages.

Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.

CATT, "R1-1801750: Discussion on enhanced PDCCH for NR URLLC," 3GPP TSG RAN WG1 Meeting #92, Feb. 26-Mar. 2, 2018, 4 pages.

CATT, "R1-1900339: Consideration on multi-TRP/panel transmission," 3GPP TSG RAN WG1 Ad-Hoc Meeting 1901, Jan. 21-25, 2019, Taipei, Taiwan, 14 pages.

(56) References Cited

OTHER PUBLICATIONS

CATT, "R1-1904561: Consideration on multi-TRP/panel transmission," 3GPP TSG RAN WG1 #96bis, Apr. 8-12, 2019, Xi'an, China, 14 pages.
Ericsson, "R1-1900728: On multi-TRP and multi-panel," 3GPP TSG RAN WG1 Meeting Ad-Hoc Meeting 1901, Jan. 21-25, 2019, Taipei, Taiwan, 9 pages.
Ericsson, "R1-1909423: Preliminary results on PDCCH over multi-TRP for URLLC," 3GPP TSG RAN WG1 Meetin RAN1#98, Aug. 26-30, 2019, Prague, Czech Republic, 4 pages.
Nokia, et al., "R1-1813489: Enhancements on Multi-TRP/Panel Transmission," 3GPP TSG RAN WG1 Meeting #95, Nov. 12-16, 2018, Spokane, Washington, 18 pages.
NTT DOCOMO, et al., "R1-1805063: Necessity of PDCCH repitition," 3GPP TSG RAN WG1 Meeting #92bis, Apr. 16-20, 2018, Sanya, China, 6 pages.
NTT DOCOMO, et al., "R1-1911184: Enhancements on multi-TRP/panel transmission," 3GPP TSG RAN WG1 #98bis, Oct. 14-20, 2019, Chongqing, China, 32 pages.
Spreadtrum Communications, "R1-1900711: Discussion on Multi-TRP transmission," 3GPP TSG RAN WG1 Meeting #AH1901, Jan. 21-25, 2019, Taipei, Taiwan, 6 pages.
Vivo, "R1-1803847: Discussion on PDCCH repetition for URLLC," 3GPP TSG RAN WG1 Meeting #92bis, Apr. 16-20, 2018, Sanya, China, 6 pages.
ZTE, "R1-1906244: Considerations on beam management for multi-TRP," 3GPP TSG RAN WG1 #97, May 13-17, 2019, Reno, Nevada, 7 pages.
ZTE, et al., "R2-2001465: Consideration on TCI state MAC CE for mTRP mPDCCH transmissions," 3GPP TSG-RAN WG2 #108, Feb. 14, 2020, 4 pages.
International Search Report and Written Opinion for International Patent Application No. PCT/EP2019/075223, mailed Jan. 8, 2020, 10 pages.
International Search Report and Written Opinion for International Patent Application No. PCT/IB2021/050917, mailed May 10, 2021, 15 pages.
Invitation to Pay Additional Fees and Partial Search for International Patent Application No. PCT/IB2021/054465, mailed Jul. 20, 2021, 27 pages.
International Search Report and Written Opinion for International Patent Application No. PCT/IB2021/054465, mailed Sep. 17, 2021, 28 pages.
International Search Report and Written Opinion for International Patent Application No. PCT/IB2021/055182, mailed Sep. 21, 2021, 22 pages.
International Preliminary Report on Patentability for International Patent Application No. PCT/IB2021/055182, mailed May 30, 2022, 28 pages.
Non-Final Office Action for U.S. Appl. No. 17/797,634, mailed Sep. 24, 2024, 11 pages.
Ericsson, "R1-2004432: Remaining issues on Multi-TRP/Panel Transmission," 3GPP TSG-RAN WG1 Meeting #101-e, May 25-Jun. 5, 2020, Electronic Meeting, 22 pages.
Samsung, "R1-2003918: On Rel. 17 FeMIMO WI," 3GPP TSG RAN WG1 #101, May 25-Jun. 5, 2020, Electronic Meeting, 12 pages.
Vivo, "R1-1717483: NR PDCCH structure," 3GPP TSG RAN WG1 Meeting #90bis, Oct. 9-13, 2017, Prague, Czech Republic, 10 pages.
Notice of Reasons for Rejection for Japanese Patent Application No. 2022-570273, mailed Dec. 5, 2023, 10 pages.
Examination Report No. 1 for Australian Patent Application No. 2021288808, mailed Jul. 7, 2023, 2 pages.
Non-Final Office Action for U.S. Appl. No. 17/279,656, mailed Dec. 7, 2023, 18 pages.
Intel Corporation, "R2-2106645: [AT114-e][035][feMIMO] TCI states indication for PDCCH," 3GPP TSG-RAN WG2 #114-e, May 19-27, 2021, Electronic Meeting, 6 pages.
Decision to Grant for Japanese Patent Application No. 2022-576204, mailed Aug. 9, 2024, 7 pages.
Notice of Allowance for U.S. Appl. No. 17/279,656, mailed Aug. 22, 2024, 7 pages.
CATT, "R1-1902019: Consideration on multi-TRP/panel transmission," 3GPP TSG RAN WG1 Meeting #96, Feb. 25-Mar. 1, 2019, Athens, Greece, 11 pages.
Ericsson, "R1-2004633: High Level Views on Rel-17 feMIMO," 3GPP TSG-RAN WG1 Meeting #101-e, May 25-Jun. 5, 2020, Electronic Meeting, 13 pages.
Ericsson, "R1-2006367: On PDCCH, PUCCH and PUSCH robustness," 3GPP TSG-RAN WG1 Meeting #102, Aug. 17-28, 2020, 3GPP TSG-RAN WG1 Meeting #102, Aug. 17-28, 2020, Electronic Meeting 12 pages.
NTT DOCOMO, Inc., "R1-1900969: PDCCH enhancement for URLLC," 3GPP TSG RAN WG1 Ad-Hoc Meeting 1901, Jan. 21-25, 2019, Taipei, Taiwan, 10 pages.
Qualcomm Incorporated, "R2-2003252: Correction on new DL MIMO MAC CE," 3GPP TSG-RAN WG2 Meeting #109-bis-e, Apr. 20-30, 2020, Electronic Meeting, 10 pages.
Examination Report for European Patent Application No. 21729016.2, mailed Mar. 27, 2024, 5 pages.
Examination Report for European Patent Application No. 21733556.1, mailed Mar. 13, 2024, 4 pages.
Notice of Reasons for Refusal for Japanese Patent Application No. 2022-576204, mailed Mar. 18, 2024, 6 pages.
Decision to Grant for Japanese Patent Application No. 2023-507890, mailed Apr. 2, 2024, 31 pages.
Li, Xiaowen, et al., "Implementation of DCI Format Detection and Transmission Scheme Confirmation of PDSCH in LTE System," Television Technology, vol. 17, Sep. 2, 2013, 6 pages.
First Office Action for Chinese Patent Application No. 202180056125.4, mailed Apr. 18, 2025, 23 pages.

\* cited by examiner

| Serving Cell ID (5 bits) | | CORESET ID (3 out of 4 bits) | Oct 1 |
|---|---|---|---|
| CORESET ID (1 out of 4 bits) | | TCI State ID$_0$ (7 bits) | Oct 2 |
| C (1 bit) | | TCI State ID$_1$ (7 bits) | Oct 3 |

FIG. 8

| Serving Cell ID (5 bits) | | CORESET ID (3 out of 4 bits) | Oct 1 |
|---|---|---|---|
| CORESET ID (1 out of 4 bits) | | TCI State ID$_0$ (7 bits) | Oct 2 |
| TCI State ID$_1$ (7 bits) | | TCI State ID$_2$ (1 out of 7 bits) | Oct 3 |
| TCI State ID$_2$ (6 out of 7 bits) | | C (2 bits) | Oct 4 |

FIG. 9

| Serving Cell ID (5 bits) | | CORESET ID (3 out of 4 bits) | Oct 1 |
|---|---|---|---|
| CORESET ID (1 out of 4 bits) | | TCI State ID$_0$ (7 bits) | Oct 2 |
| C$_1$ (1 bit) | | TCI State ID$_1$ (7 bits) | Oct 3 |
| ... | | ... | |
| C$_{N-1}$ (1 bit) | | TCI State ID$_{N-1}$ (7 bits) | |

FIG. 10

| Serving Cell ID (5 bits) | CORESET ID (3 out of 5 bits) | Oct 1 |
|---|---|---|
| CORESET ID (2 out of 5 bits) | TCI State ID$_0$ (6 out of 7 bits) | Oct 2 |
| TCI State ID$_0$ (1 out of 7 bits) | TCI State ID$_1$ (7 bits) | Oct 3 |

*FIG. 11*

| Serving Cell ID (5 bits) | CORESET ID$_0$ (3 out of 4 bits) |
|---|---|
| CORESET ID$_0$ (1 out of 4 bits) | TCI State ID$_{0,0}$ (7 bits) |
| G$_0$ (1 bit) | TCI State ID$_{0,1}$ (7 bits) |
| R (3 bits) | CORESET ID$_1$ (5 bits) |
| R (1 bit) | TCI State ID$_{1,0}$ (7 bits) |
| G$_1$ (1 bit) | TCI State ID$_{1,1}$ (7 bits) |

*FIG. 12*

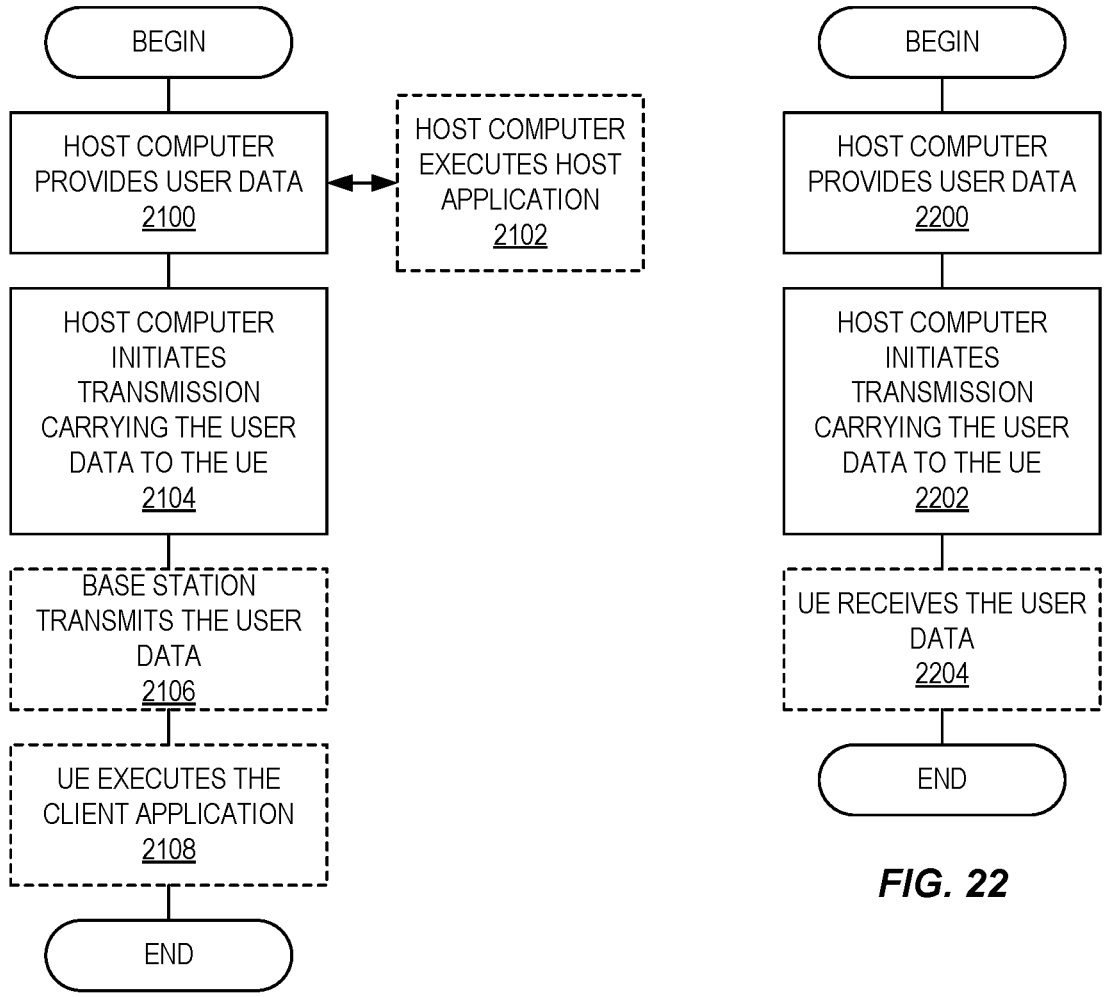

ACTIVATION OF TWO OR MORE TCI STATES FOR ONE OR MORE CORESETs

RELATED APPLICATIONS

This application is a 35 U.S.C. § 371 national phase filing of International Application No. PCT/IB2021/055182, filed Jun. 11, 2021, which claims the benefit of provisional patent application Ser. No. 63/038,385, filed Jun. 12, 2020, the disclosures of which are hereby incorporated herein by reference in their entireties.

TECHNICAL FIELD

The present disclosure relates to Transmission Configuration Indicator (TCI) state activation in a cellular communications system.

BACKGROUND

The next generation mobile wireless communication system (5G), or New Radio (NR), will support a diverse set of use cases and a diverse set of deployment scenarios. The later includes deployment at both low frequencies (below 6 Gigahertz (GHz)) and very high frequencies (up to 10's of GHz).

NR Frame Structure and Resource Grid

NR uses Cyclic Prefix Orthogonal Frequency Division Multiplexing (CP-OFDM) in both downlink (i.e., from a network node, gNB, or base station, to a user equipment or UE) and uplink (i.e., from UE to gNB). Discrete Fourier Transform (DFT) spread Orthogonal Frequency Division Multiplexing (OFDM) is also supported in the uplink. In the time domain, NR downlink and uplink are organized into equally-sized subframes of 1 millisecond (ms) each. A subframe is further divided into multiple slots of equal duration. The slot length depends on subcarrier spacing. For subcarrier spacing of $\Delta f=15$ kilohertz (kHz), there is only one slot per subframe, and each slot consists of 14 OFDM symbols.

Data scheduling in NR is typically on a slot basis. An example is shown in FIG. 1 with a 14-symbol slot, where the first two symbols contain Physical Downlink Control Channel (PDCCH), and the rest of the symbols contain physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times 2^\mu)$ kHz where $\mu \in 0, 1, 2, 3, 4$. $\Delta f=15$ kHz is the basic subcarrier spacing. The slot durations at different subcarrier spacings is given by $$\frac{1}{2^\mu} \text{ ms.}$$

In the frequency domain, a system bandwidth is divided into resource blocks (RBs), each corresponding to twelve contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one resource element (RE).

Downlink (DL) transmissions can be dynamically scheduled, i.e., in each slot the gNB transmits Downlink Control Information (DCI) over Physical Downlink Control Channel (PDCCH) about which UE data is to be transmitted to and which RBs in the current downlink slot the data is transmitted on. The UE data is carried on PDSCH.

There are three DCI formats defined for scheduling PDSCH in NR, i.e., DCI format 1_0, DCI format 1_1, and DCI format 1_2. DCI format 1_0 has a smallest size and can be used when a UE is not fully connected to the network, while DCI format 1_1 can be used for scheduling Multiple-Input-Multiple-Output (MIMO) transmissions with two transport blocks (TBs). DCI format 12 supports configurable sizes for some fields in the DCI so that a smaller DCI size than DCI format 1_1 can be configured.

In downlink, a UE first detects and decodes a PDCCH and, if the decoding is successful, the UE then decodes the corresponding PDSCH based on the decoded control information in the PDCCH.

Similar to downlink, uplink transmission can be dynamically scheduled in which a UE first decodes uplink grants in a PDCCH and then transmits data over PUSCH based the decoded control information in the uplink grant such as modulation order, coding rate, uplink resource allocation, etc.

QCL and TCI States

Several signals can be transmitted from different antenna ports of a same base station. These signals can have the same large-scale properties such as Doppler shift/spread, average delay spread, or average delay. These antenna ports are then said to be Quasi Co-Located (QCL). Note that "QCL" is sometimes also used herein to refer to "Quasi Co-Location."

If the UE knows that two antenna ports are QCL with respect to a certain parameter (e.g., Doppler spread), the UE can estimate that parameter based on one of the antenna ports and apply that estimate for receiving signal on the other antenna port. Typically, the first antenna port is represented by a measurement reference signal such as Channel State Information Reference Signal (CSI-RS) or Synchronization Signal Block (SSB), known as a source RS, and the second antenna port is a Demodulation Reference Signal (DMRS), known as a target RS.

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS are defined:

Type A: {Doppler shift, Doppler spread, average delay, delay spread},
Type B: {Doppler shift, Doppler spread},
Type C: {average delay, Doppler shift}, and
Type D: {Spatial Rx parameter}.

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them.

For dynamic beam and Transmission/Reception Point (TRP) selection, a UE can be configured through RRC signaling with up to one-hundred and twenty-eight (128) Transmit Configuration Indicator (TCI) states for PDSCH in frequency range 2 (FR2) and up to eight (8) TCI states in FR1, depending on UE capability.

Each TCI state contains QCL information, i.e. one or two source DL RSs, each source RS associated with a QCL type. For example, a TCI state contains a pair of reference signals, each associated with a QCL type, e.g. two different CSI-RSs {CSI-RS1, CSI-RS2} are configured in the TCI state as {qcl-Type1,qcl-Type2}={Type A, Type D}. This means the UE can derive Doppler shift, Doppler spread, average delay, delay spread from CSI-RS1 and Spatial Rx parameter (i.e., the RX beam to use) from CSI-RS2.

The list of TCI states can be interpreted as a list of possible beams transmitted from the network or a list of possible TRPs used by the network to communicate with the UE.

For PDSCH transmission, up to eight (8) TCI states or pairs of TCI states may be activated, and a UE may be dynamically indicated by a TCI codepoint in DCI one or two of the activated TCI states for PDSCH reception. The UE uses the TCI-State according to the value of the 'Transmission Configuration Indication' field in the detected PDCCH with DCI for determining PDSCH antenna port quasi co-location.

Default TCI State(s) for PDSCH

If none of the TCI codepoints are mapped to more than a single TCI state and the offset between the reception of a DL DCI and the corresponding PDSCH is less than a threshold timeDurationForQCL configured by higher layers, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE. Here the QCL parameter(s) used for PDCCH may refer to the source RS(s) and the corresponding QCL type(s) specified in the TCI state activated for the CORESET. The TCI state may be referred to as the default TCI state for PDSCH. In other words, the UE may apply QCL type-D property of the TCI state in a slot for receiving PDSCH before decoding the corresponding PDCCH. After a PDCCH is decoded successfully and if the offset indicated in the corresponding DCI is less than the threshold, the UE may apply also other QCL properties of the TCI state in decoding the PDSCH.

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states. The two TCI states may then be the default TCI states for PDSCH.

For a UE configured by higher layer parameter PDCCH-Config that contains two different values of CORESETPooIndexin ControlResourceSet, if the offset between the reception of the DL DCI and the corresponding PDSCH is less than the threshold time-DurationForQCL, the UE may assume that the DM-RS ports of PDSCH associated with a value of CORESET-PooIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPooIndexas the PDCCH scheduling that PDSCH, in the latest slot in which one or more CORESETs associated with the same value of CORESETPooIndexas the PDCCH scheduling that PDSCH within the active BWP of the serving cell are monitored by the UE. The TCI state activated for the CORESET may then be the default TCI state for PDSCH scheduled by PDCCH in CORESET(s) with the same value of CORESETPooIIndex.

CORESET and TCI States for PDCCH

In Radio Resource Control (RRC), see Third Generation Partnership Project (3GPP) Technical Specification (TS) 38.331 (e.g., V16.0.0), a list of up to sixty-four (64) TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB.

For each CORESET, only one TCI state is activated by Medium Access Control (MAC) Control Element (CE) in NR Rel-16. The MAC CE specified for this can be found in Clause 6.1.3.15 of 3GPP TS 38.321 and is presented below:

***Start Excerpt from 3GPP TS 38.321***

6.1.3.15 TCI State Indication for UE-Specific PDCCH MAC CE
The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList-rH6 or simultaneousTCI-UpdateListSecond-r16 as specified in TS 38.331 [5], this MAC CE applies to all the Serving Cells in the set simultaneousTCI-UpdateList-r16 or simultaneousTCI-UpdateListSecond-r16, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci- StatesPDCCH-ToReleaseList in the controlResource-Set identified by the indicated CORESET ID. The length of the field is 7 bits.

Reproduced Herein as FIG. 3

FIG. 6.1.3.15-1: TCI State Indication for UE-Specific PDCCH MAC CE

***End Excerpt from 3GPP TS 38.321***

Ultra-Reliable Low Latency (URLLC) Data Transmission Over Multiple Transmission Points Reliable PDSCH transmission over multiple transmission points or panels or TRPS has been introduced in 3GPP for NR Rel-16, in which a TB may be transmitted over multiple TRPs to achieve diversity. Reliability is achieved by transmitting different layers of an encoded codeword (CW) for the TB on the same resource over two TRPs (Scheme 1a), or different parts of a CW on different frequency resources over two TRPs (Scheme 2a), or by repeating the same TB over two TRPs in time (Schemes 3 and 4) or frequency domain (Scheme 2b). For this purpose, two TCI states are indicated via the 'Transmission Configuration Indication' or TCI field in a DCI scheduling the PDSCH.

In NR Rel-17, it has been proposed to further introduce PDCCH enhancement with multiple TRPs by repeating a PDCCH from different TRPs as shown in FIG. 4. One option is to associate PDCCH in a CORESET with multiple TCI states, and dividing REs of a PDCCH candidate into multiple subsets each associated with one of the TCI states. A PDCCH in each subset is then transmitted from a different TRP.

SUMMARY

Systems and methods are disclosed herein for activation of two or more Transmission Configuration Indication (TCI) states for a Physical Downlink Control Channel (PDCCH) in one or more Control Resource Sets (CORESETs) in a cellular communications system. In one embodiment, a method performed by a wireless communication device for activation of multiple TCI states for a PDCCH in one or more CORESETs in a cellular communications system comprises receiving, from a network node, signaling that activates $N_{TCI}$ TCI states for one or more CORESETs, wherein $N_{TCI}>1$. In this manner, activation of two or more TCI states for PDCCH in one or more CORESETs is enabled.

In one embodiment, the method further comprises receiving PDCCHs in the one or more CORESETs in accordance with the $N_{TCI}$ TCI states that are activated for one or more CORESETs. In one embodiment, the method further comprises performing one or more actions in accordance with downlink control information carried by the received PDCCHs. In one embodiment, the received PDCCHs comprise two copies of a same DCI received from two or more respective transmission points, and the two or more respective transmission points correspond to two or more respective TCI states from among the $N_{TCI}$ TCI states that are activated for one or more CORESETs. In one embodiment, the two copies of the same DCI are received from the two or more respective transmission points in a same CORESET.

In one embodiment, the one or more CORESETs consist of a single CORESET, and the $N_{TCI}$ TCI states are activated for the single CORESET.

In one embodiment, the one or more CORESETs comprise two or more CORESETs, and the signaling comprises, for each CORESET of the two or more CORESETs, information that indicates $N_{TCI}$ TCI states activated for the CORESET. In one embodiment, $N_{TCI}$ is different for at least two of the two or more CORESETs. In another embodiment, $N_{TCI}$ is the same for at least two of the two or more CORESETs.

In one embodiment, receiving the signaling that activates $N_{TCI}$ TCI states for one or more CORESETs comprises receiving a configuration of M TCI state lists for a CORESET, wherein each TCI state list of the M TCI state lists comprises up to a predefined or preconfigured maximum number of TCI states and M>1, and receiving, from the network node, an indication of one of the M TCI state lists for the CORESET, wherein TCI states in the one of the M TCI state lists are the $N_{TCI}$ TCI states that are activated for the CORESET. In one embodiment, the predefined or preconfigured maximum number of TCI states is greater than or equal to 2. In one embodiment, receiving the indication of the one of the M TCI state lists for the CORESET comprises receiving a Medium Access Control (MAC) Control Element (CE) that comprises the indication of the one of the M TCI state lists for the CORESET. In one embodiment, receiving the indication of the one of the M TCI state lists for the CORESET comprises receiving a MAC CE that comprises a first octet that comprises a serving cell identity (ID) of a serving cell of the wireless communication device and a first part of a CORESET ID of the CORESET and a second octet that comprises a second part of the CORESET ID of the CORESET and a TCI state ID, wherein the wireless communication device (512) interprets the TCI state ID as the indication of the one of the M TCI state lists for the CORESET.

In one embodiment, receiving the signaling that activates $N_{TCI}$ TCI states for one or more CORESETs comprises receiving, from the network node, a MAC CE that comprises, for each CORESET of the one or more CORESETs, information that indicates the $N_{TCI}$ TCI states that are activated for the CORESET. In one embodiment, the one or more CORESETs consist of a single CORESET, and the MAC CE comprises, for each TCI state of the $N_{TCI}$ TCI states that are activated for the single CORESET, an indication of the TCI state. In one embodiment, the MAC CE comprises a first octet that comprises a serving cell ID of a serving cell of the wireless communication device and a first part of a CORESET ID of the single CORESET, a second octet that comprises a second part of the CORESET ID of the single CORESET and a first TCI state ID of a first TCI state of the $N_{TCI}$ TCI states that are activated for the single CORESET, and a third octet that comprises a second TCI state ID of a second TCI state of the $N_{TCI}$ TCI states that are activated for the single CORESET. In one embodiment, the MAC CE further comprises an indication of which of the $N_{TCI}$ TCI states that are activated for the single CORESET is a default TCI state for Physical Downlink Shared Channel (PDSCH). In another embodiment, the first TCI state indicated by the first TCI state ID in the second octet of the MAC CE is a default TCI state for PDSCH. In one embodiment, the MAC CE is a fixed size MAC CE. In another embodiment, the MAC CE is a flexible size MAC CE, wherein a size of the MAC CE is indicated by a length field of an associated header and the wireless communication device interprets a value of $N_{TCI}$ based on a value of the length field.

In one embodiment, the MAC CE comprises a first octet that comprises a serving cell ID of a serving cell of the wireless communication device and a first part of a CORESET ID of the single CORESET, a second octet that comprises a second part of the CORESET ID of the single CORESET and a first part of a TCI state ID of a first TCI state of the $N_{TCI}$ TCI states that are activated for the single CORESET, and a third octet that comprises a second part of the TCI state ID of the first TCI state of the $N_{TCI}$ TCI states that are activated for the single CORESET and a second TCI state ID of a second TCI state of the $N_{TCI}$ TCI states that are activated for the single CORESET.

In one embodiment, the MAC CE comprises a first octet that comprises a serving cell ID of a serving cell of the wireless communication device and a first part of a CORESET ID of the single CORESET, a second octet that comprises a second part of the CORESET ID of the single CORESET and a first TCI state ID of a first TCI state of the $N_{TCI}$ TCI states that are activated for the single CORESET, a third octet that comprises a second TCI state ID of a second TCI state of the $N_{TCI}$ TCI states that are activated for the single CORESET and a first part of a third TCI state ID of a third TCI state of the of the $N_{TCI}$ TCI states that are activated for the single CORESET, and a fourth octet that comprises a second part of the third TCI state ID of the third TCI state of the of the $N_{TCI}$ TCI states that are activated for the single CORESET. In one embodiment, the MAC CE further comprises an indication of which of the $N_{TCI}$ TCI states that are activated for the single CORESET is a default TCI state for PDSCH. In another embodiment, the first TCI state indicated by the first TCI state ID in the second octet of the MAC CE is a default TCI state for PDSCH.

In one embodiment, the MAC CE comprises a first octet that comprises a serving cell ID of a serving cell of the wireless communication device and a first part of a CORESET ID of the single CORESET. The MAC CE further comprises a second octet that comprises a second part of the CORESET ID of the single CORESET and a first TCI state ID of a first TCI state of the $N_{TCI}$ TCI states that are activated for the single CORESET. The MAC CE further comprises a third octet that comprises an indication of whether a second TCI state of the $N_{TCI}$ TCI states that are activated for the single CORESET is a default TCI state for PDSCH and a second TCI state ID of a second TCI state of the $N_{TCI}$ TCI states that are activated for the single CORESET. In one embodiment, the MAC CE further comprises a fourth octet that comprises an indication of whether a third TCI state of the $N_{TCI}$ TCI states that are activated for the single CORESET is a default TCI state for PDSCH and a third TCI state ID of the third TCI state of the of the $N_{TCI}$ TCI states that are activated for the single CORESET.

In one embodiment, the one or more CORESETs comprise two or more CORESETs, and the MAC CE comprises, for each CORESET of the two or more CORESETs and for each TCI state of the $N_{TCI}$ TCI states that are activated for the CORESET, an indication of the TCI state. In one embodiment, the MAC CE comprises a first octet that comprises a serving cell ID of a serving cell of the wireless communication device and a first part of a first CORESET ID of a first CORESET of the two or more CORESETs. The MAC CE further comprises a second octet that comprises a second part of the first CORESET ID of the first CORESET and a first TCI state ID of a first TCI state of the $N_{TCI}$ TCI states that are activated for the first CORESET. The MAC CE further comprises a third octet that comprises an indication of whether additional octets are present and a second TCI state ID of a second TCI state of the $N_{TCI}$ TCI states that are activated for the first CORESET. In one embodiment, the MAC CE further comprises a first additional octet that comprises a second CORESET ID of a second CORESET of the two or more CORESETs, a second additional octet that comprises a first TCI state ID of a first TCI state of the $N_{TCI}$ TCI states that are activated for the second CORESET, and a third additional octet that comprises an indication of whether additional octets are present and a second TCI state ID of a second TCI state of the $N_{TCI}$ TCI states that are activated for the second CORESET.

Corresponding embodiments of a wireless communication device for activation of multiple TCI states for a PDCCH in one or more CORESETs in a cellular communications system are also disclosed. In one embodiment, the wireless communication device adapted to receive, from a network node, signaling that activates $N_{TCI}$ TCI states for one or more CORESETs, wherein $N_{TCI}>1$.

In one embodiment, a wireless communication device for activation of multiple TCI states for a PDCCH in one or more CORESETs in a cellular communications system comprises one or more transmitters, one or more receivers, and processing circuitry associated with the one or more transmitters and the one or more receivers. The processing circuitry is further configured to cause the wireless communication device to receive, from a network node, signaling that activates $N_{TCI}$ TCI states for one or more CORESETs, wherein $N_{TCI}>1$.

Embodiments of a method performed by a network node for activation of multiple TCI states for a PDCCH in one or more CORESETs in a cellular communications system are also disclosed. In one embodiment, the method comprises sending, to a wireless communication device, signaling that activates $N_{TCI}$ TCI states for one or more CORESETs, wherein $N_{TCI}>1$.

In one embodiment, the one or more CORESETs consist of a single CORESET, and the $N_{TCI}$ TCI states are activated for the single CORESET.

In one embodiment, the one or more CORESETs comprise two or more CORESETs, and the signaling comprises, for each CORESET of the two or more CORESETs, information that indicates $N_{TCI}$ TCI states activated for the CORESET. In one embodiment, $N_{TCI}$ is different for at least two of the two or more CORESETs. In another embodiment, wherein $N_{TCI}$ is the same for at least two of the two or more CORESETs.

In one embodiment, sending the signaling that activates $N_{TCI}$ TCI states for one or more CORESETs comprises sending, to the wireless communication device, a configuration of M TCI state lists for a CORESET, wherein each TCI state list of the M TCI state lists comprises up to a predefined or preconfigured maximum number of TCI states and M>1, and sending, to the wireless communication device (512), an indication of one of the M TCI state lists for the CORESET, wherein TCI states in the one of the M TCI state lists are the $N_{TCI}$ TCI states that are activated for the CORESET. In one embodiment, the predefined or preconfigured maximum number of TCI states is greater than or equal to 2. In one embodiment, sending the indication of the one of the M TCI state lists for the CORESET comprises sending a MAC CE that comprises the indication of the one of the M TCI state lists for the CORESET. In another embodiment, sending the indication of the one of the M TCI state lists for the CORESET comprises sending a MAC CE that comprises a first octet that comprises a serving cell ID of a serving cell of the wireless communication device and a first part of a CORESET ID of the CORESET and a second octet that comprises a second part of the CORESET ID of the CORESET and a TCI state ID, wherein the TCI state ID is interpreted as the indication of the one of the M TCI state lists for the CORESET.

In one embodiment, sending the signaling that activates $N_{TCI}$ TCI states for one or more CORESETs comprises sending, to the wireless communication device, a MAC CE that comprises, for each CORESET of the one or more CORESETs, indicates of the $N_{TCI}$ TCI states that are activated for the CORESET. In one embodiment, the one or more CORESETs consist of a single CORESET, and the MAC CE comprises, for each TCI state of the $N_{TCI}$ TCI states that are activated for the single CORESET, an indication of the TCI state. In one embodiment, the MAC CE comprises a first octet that comprises a serving cell ID of a serving cell of the wireless communication device and a first part of a CORESET ID of the single CORESET, a second octet that comprises a second part of the CORESET ID of the single CORESET and a first TCI state ID of a first TCI state of the $N_{TCI}$ TCI states that are activated for the single CORESET, and a third octet that comprises a second TCI state ID of a second TCI state of the $N_{TCI}$ TCI states that are activated for the single CORESET. In one embodiment, the MAC CE further comprises an indication of which of the $N_{TCI}$ TCI states that are activated for the single CORESET is a default TCI state for PDSCH. In another embodiment, the first TCI state indicated by the first TCI state ID in the second octet of the MAC CE is a default TCI state for PDSCH. In one embodiment, the MAC CE is a fixed size MAC CE. In one embodiment, the MAC CE is a flexible size MAC CE, wherein a size of the MAC CE is indicated by a length field of an associated header and the wireless communication device (512) interprets a value of $N_{TCI}$ based on a value of the length field.

In one embodiment, the MAC CE comprises a first octet that comprises a serving cell ID of a serving cell of the wireless communication device and a first part of a CORESET ID of the single CORESET, a second octet that comprises a second part of the CORESET ID of the single CORESET and a first part of a TCI state ID of a first TCI state of the $N_{TCI}$ TCI states that are activated for the single CORESET, and a third octet that comprises a second part of the TCI state ID of the first TCI state of the $N_{TCI}$ TCI states that are activated for the single CORESET and a second TCI state ID of a second TCI state of the $N_{TCI}$ TCI states that are activated for the single CORESET.

In one embodiment, the MAC CE comprises a first octet that comprises a serving cell ID of a serving cell of the wireless communication device (512) and a first part of a CORESET ID of the single CORESET, a second octet that comprises a second part of the CORESET ID of the single CORESET and a first TCI state ID of a first TCI state of the $N_{TCI}$ TCI states that are activated for the single CORESET, a third octet that comprises a second TCI state ID of a second TCI state of the $N_{TCI}$ TCI states that are activated for the single CORESET and a first part of a third TCI state ID of a third TCI state of the of the $N_{TCI}$ TCI states that are activated for the single CORESET, and a fourth octet that comprises a second part of the third TCI state ID of the third TCI state of the of the $N_{TCI}$ TCI states that are activated for the single CORESET. In one embodiment, the MAC CE further comprises an indication of which of the $N_{TCI}$ TCI states that are activated for the single CORESET is a default TCI state for PDSCH. In another embodiment, the first TCI state indicated by the first TCI state ID in the second octet of the MAC CE is a default TCI state for PDSCH.

In one embodiment, the MAC CE comprises a first octet that comprises a serving cell ID of a serving cell of the wireless communication device and a first part of a CORESET ID of the single CORESET. The MAC CE further comprises a second octet that comprises a second part of the CORESET ID of the single CORESET and a first TCI state ID of a first TCI state of the $N_{TCI}$ TCI states that are activated for the single CORESET. The MAC CE further comprises an indication of whether a second TCI state of the $N_{TCI}$ TCI states that are activated for the single CORESET is a default TCI state for PDSCH and a second TCI state ID of a second TCI state of the $N_{TCI}$ TCI states that are activated for the single CORESET. In one embodiment, the MAC CE further comprises a fourth octet that comprises an indication of whether a third TCI state of the $N_{TCI}$ TCI states that are activated for the single CORESET is a default TCI state for PDSCH and a third TCI state ID of the third TCI state of the of the $N_{TCI}$ TCI states that are activated for the single CORESET.

In one embodiment, the one or more CORESETs comprise two or more CORESETs, and the MAC CE comprises, for CORESET of the two or more CORESETs and for each TCI state of the $N_{TCI}$ TCI states that are activated for the CORESET, an indication (e.g., ID) of the TCI state. In one embodiment, the MAC CE comprises a first octet that comprises a serving cell ID of a serving cell of the wireless communication device and a first part of a first CORESET ID of a first CORESET of the two or more CORESETs. The MAC CE further comprises a second part of the first CORESET ID of the first CORESET and a first TCI state ID of a first TCI state of the $N_{TCI}$ TCI states that are activated for the first CORESET. The MAC CE further comprises a third octet that comprises an indication of whether additional octets are present and a second TCI state ID of a second TCI state of the $N_{TCI}$ TCI states that are activated for the first CORESET. In one embodiment, the MAC CE further comprises a first additional octet that comprises a second CORESET ID of a second CORESET of the two or more CORESETs, a second additional octet that comprises a first TCI state ID of a first TCI state of the $N_{TCI}$ TCI states that are activated for the second CORESET, and a third octet that comprises an indication of whether additional octets are present and a second TCI state ID of a second TCI state of the $N_{TCI}$ TCI states that are activated for the second CORESET.

Corresponding embodiments of a network node are also disclosed. In one embodiment, a network node for activation of multiple TCI states for a PDCCH in one or more CORESETs in a cellular communications system is adapted to send, to a wireless communication device (512), signaling that activates $N_{TCI}$ TCI states for one or more CORESETs, wherein $N_{TCI}>1$.

In one embodiment, a network node for activation of multiple TCI states for a PDCCH in one or more CORESETs in a cellular communications system, the network node comprising processing circuitry configured to cause the network node to send, to a wireless communication device, signaling that activates $N_{TCI}$ TCI states for one or more CORESETs, wherein $N_{TCI}>1$.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 8 through 12 illustrate examples of a Medium Access Control (MAC) Control Element (CE) for activation of multiple TCI states for one or more CORESETs in accordance with a second embodiment of the present disclosure;

FIGS. 21, 22, 23, and 24 are flow charts that illustrate example embodiments of methods implemented in a communication system such as that of FIG. 19.

DETAILED DESCRIPTION

Figure 1:
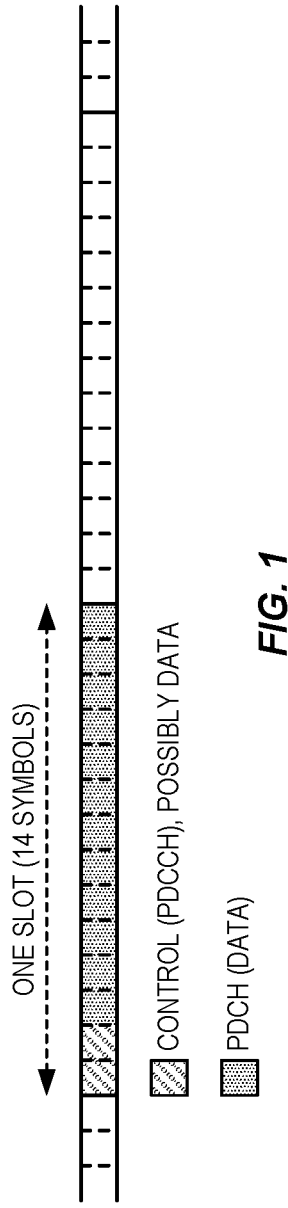
FIG. 1 illustrates a typical slot in Third Generation Partnership Project (3GPP) New Radio (NR)
Figure 2:
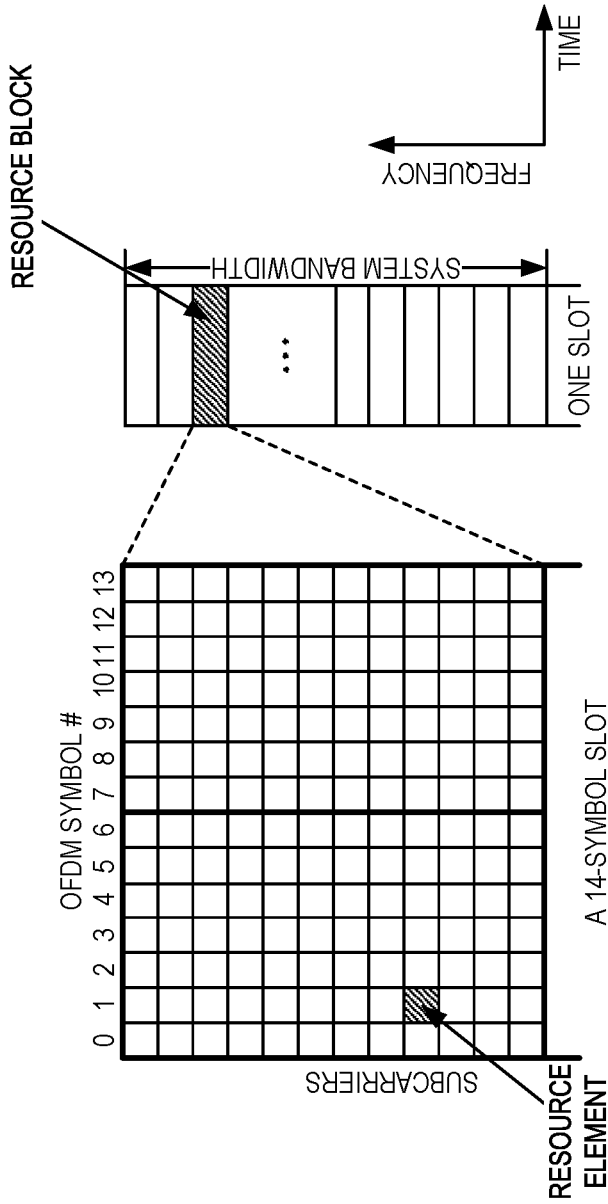
FIG. 2 illustrates the basic NR time-frequency resource grid.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may be a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better coverage, reliability and/or data rates for PDSCH and/or PDCCH. There are two different operation modes for scheduling PDSCH over multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). There is no mechanism in NR to activate multiple Transmission Configuration Indicator (TCI) states for Physical Downlink Control Channel (PDCCH) in a Control Resource Set (CORESET). Currently, for each CORESET in NR, only one TCI state can be activated. The activation is typically done with a Medium Access Control (MAC) Control Element (CE). Thus, there is a need for systems and methods for activating multiple TCI states for a CORESET and the associated signaling details.

Certain aspects of the present disclosure and their embodiments may provide solutions to the aforementioned or other challenges. In this disclosure, different ways of signaling the activation of $N_{TCI}>1$ TCI states for a CORESET(s) are disclosed. In one embodiment, the activation of $N_{TCI}>1$ TCI states for a CORESET(s) is signaled in a way that reuses the existing MAC CE. Embodiments are also disclosed herein for signaling the activation of $N_{TCI}>1$ TCI states for a CORESET(s) in a new way, e.g., using a new MAC CE.

Certain embodiments may provide one or more of the following technical advantage(s). Advantages of the solution depend on the particular embodiment. One advantage of the first embodiment, which proposes a way to reuse the existing MAC CE, is that no new MAC CE needs to be specified. In NR, many new MAC CEs have been defined to the extent that the Logical Channel Identity (LCID) space is running out. Even with a solution to the issue of the limited LCID space, adding more MAC CEs especially for similar functionality complicates the NR specification and interoperability between releases. In this embodiment, a number of lists may be needed. For example, assuming that a total of 64 TCI states are possible and that 2 TCI states are selected per the new list being introduced, then there are 2016 different ways of choosing 2 TCI states out of 64 possible TCI states. But since the TCI state identity (ID) field in the MAC CE only has 7 bits, there is a maximum of 128 lists.

One advantage of the second embodiment is that it enables more flexible activated TCI state selection than the first embodiment. In the first embodiment, the pair of TCI states is preconfigured (e.g., by Radio Resource Control (RRC) signaling), and enabling the same flexibility as in the second embodiment may not be possible due to the amount of permutations. Another advantage of the second embodiment as it relates to TCI state activation for two or more CORESETs using a single MAC CE is that it saves overhead compared to existing MAC CE signaling for CORESET TCI state activation. In the existing MAC CE for TCI state activation for a CORESET, one MAC CE needs to be sent for each CORESET. The solution proposed in the second embodiment enables a flexible number of TCI states (i.e., two or more TCI states) to be activated for multiple CORESETs, which saves signaling overhead.

Figure 5:
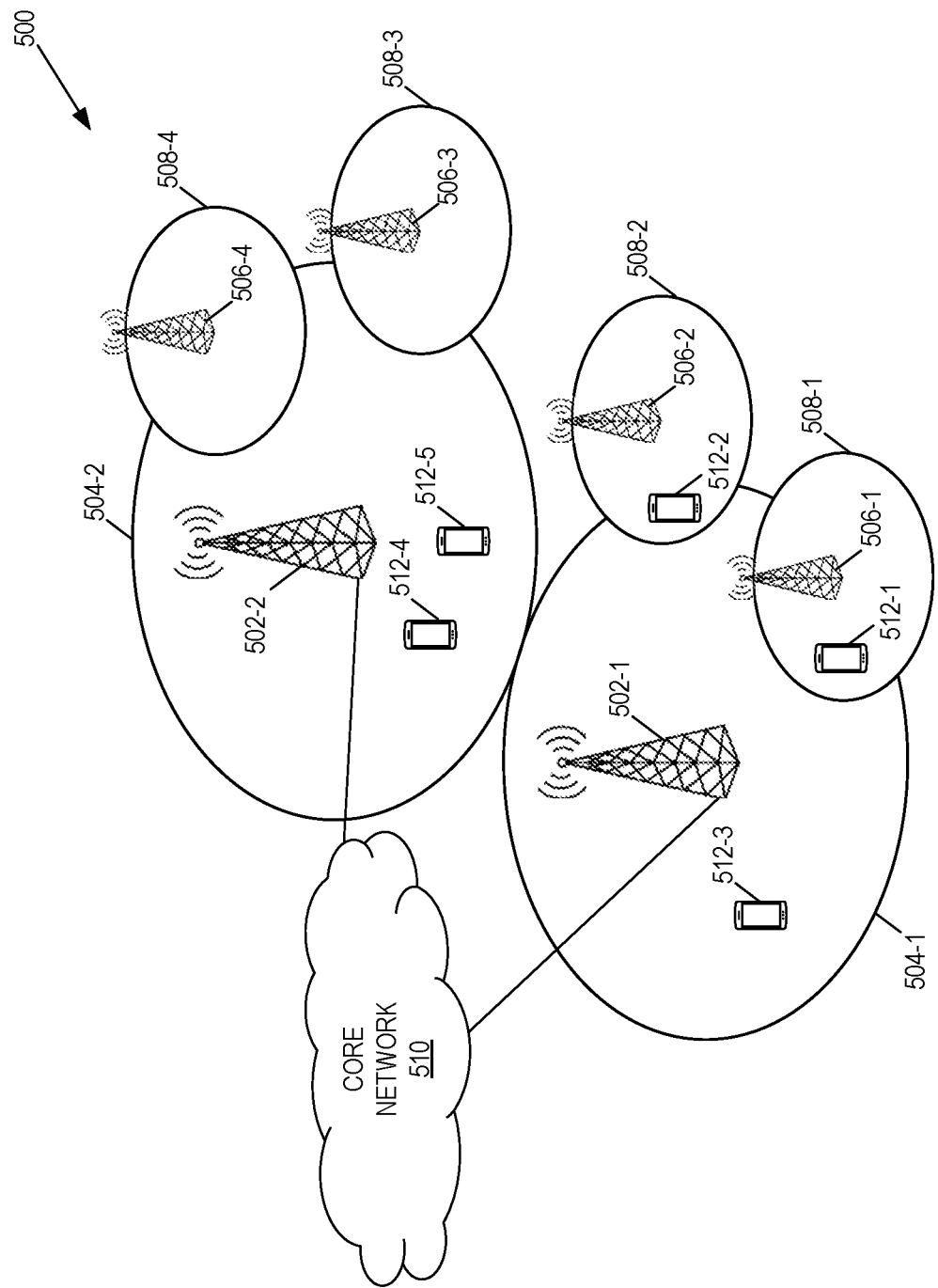
FIG. 5 illustrates one example of a cellular communications system in which embodiments of the present disclosure may be implemented.

FIG. 5 illustrates one example of a cellular communications system 500 in which embodiments of the present disclosure may be implemented. In the embodiments described herein, the cellular communications system 500 is a 5G system (5GS) including a Next Generation RAN (NG-RAN) and a 5G Core (5GC). In this example, the RAN includes radio access nodes 502-1 and 502-2, which in the 5GS include NR base stations (gNBs) and optionally next generation eNBs (ng-eNBs) (e.g., LTE RAN nodes connected to the 5GC), controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. Each base station 502 includes one or more Transmission Points (TRPs) (not shown). Also, in case of multi-TRP transmission, one of the TRPs may be another base station, e.g., data are transmitted from two base stations to a wireless communication device 512 (under control of one of the base stations through base station coordination).

The RAN may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like.

Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. Each of the low power nodes 506 is or includes one (or more) TRP. Also, in case of multi-TRP transmission, one of the TRPs may be another low power node 506 (or a base station 502).

The cellular communications system 500 also includes a core network 510, which in the 5GS is the 5GC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs and as such sometimes referred to herein as UEs 512, but the present disclosure is not limited thereto.

Figure 6:
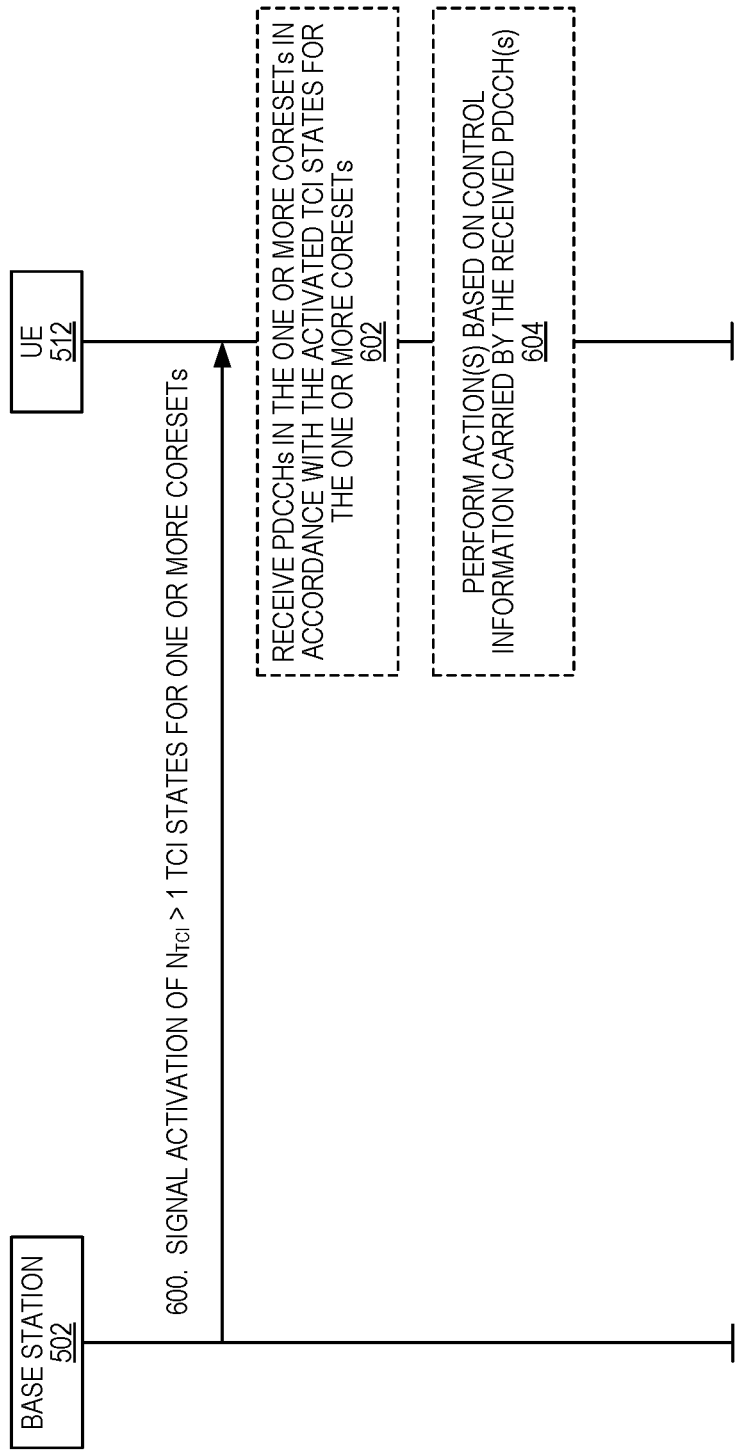
FIG. 6 illustrates the operation of a base station and a User Equipment (UE) for activation of $N_{TCI} > 1$ TCI states for a Control Resource Set(s) (CORESET(s)) in accordance with embodiments of the present disclosure.

FIG. 6 illustrates the operation of a base station 502 and a UE 512 for activation of $N_{TCI}>1$ TCI states for a CORESET(s) in accordance with embodiments of the present disclosure. Optional steps are represented by dashed lines/boxes. As illustrated, the base station 502 signals activation of $N_{TCI}>1$ TCI states for a CORESET(s) to the UE 512 (step 600). As discussed below, in some embodiments, the base station 502 signals activation of $N_{TCI}>1$ TCI states for a single CORESET. In some other embodiments, the base station 502 signals activation of $N_{TCI}>1$ TCI states for each of two (or more) CORESETs, where $N_{TCI}$ may be the same for all of these CORESETs or may be different for at least two of these CORESETs. As described below, some embodiments, the signaling of the activation of the $N_{TCI}>1$ TCI states for the CORESET(s) uses an existing MAC CE (e.g., an existing PDCCH MAC CE). However, in some other embodiments, the signaling of the activation of the $N_{TCI}>1$ TCI states for the CORESET(s) uses a new signaling structure such as, e.g., a new MAC CE (e.g., a new PDCCH MAC CE).

Figure 4:
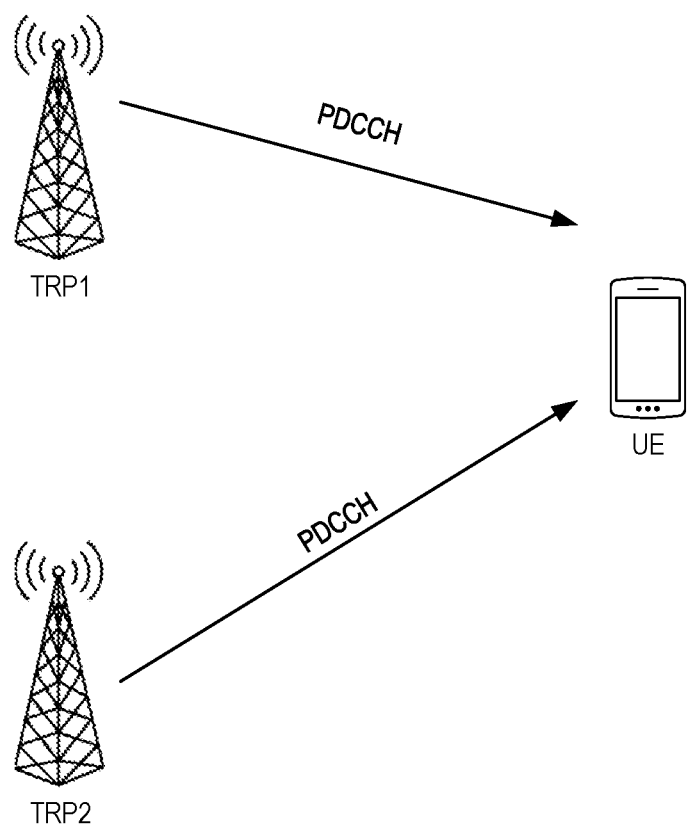
FIG. 4 illustrates a Physical Downlink Control Channel (PDCCH) enhancement proposed in NR Release 17 with multiple Transmission/Reception Points (TRPs) where a PDCCH is repeated from different TRPs.

The UE 512 then receives PDCCHs (e.g., from two or more TRPs) in the CORESET(s) in accordance with the activated TCI states (step 602). For example, a particular PDCCH may be repeated from two or more TRPs (e.g., as shown in FIG. 4 described above). In one particular example, PDCCH in a CORESET is associated with multiple activated TCI states, and Resource Elements (REs) of a PDCCH candidate are divided into multiple subsets each associated with one of the activated TCI states. A PDCCH in each subset is then transmitted from a different TRP and received by the UE 512 in accordance with the respective (activated) TCI states.

The UE may then perform one or more actions based on the received PDCCHs (step 604). For example, if the received PDCCHs are repetitions of a same PDCCH, then that same PDCCH is decoded to obtain the respective DCI, and the UE 512 then operates in accordance with the DCI (e.g., receives a downlink transmission in accordance with a downlink assignment in the DCI or transmits an uplink transmission in accordance with an uplink grant in the DCI).

Now, details of embodiments of the signaling of the activation of the $N_{TCI}>1$ TCI states for the CORESET(s), e.g., in step 600 of FIG. 6 are provided.

First Embodiment—Reuse of Existing MAC CE

In this embodiment, for each CORESET (i.e., ControlResourceSet), the UE 512 is configured (e.g., via RRC signaling) with multiple TCI state lists, each having up to a maximum number (e.g., predefined or preconfigured maximum number) of TCI states in each list. In some embodiments, the maximum number of TCI states in each list is given by a parameter (e.g., an RRC parameter referred to herein as maxNrofTCI-StatesPerPDCCH, which is set to an integer value (e.g., two). The TCI states in each of the multiple TCI state lists are the activated TCI states for the CORESET if the list is selected. The existing MAC CE (see FIG. 3) is reused to activate one of the lists by interpreting the "TCI state ID" field as an ID (e.g., tciListID in the example below) of the list of TCI states to be activated.

Figure 7:
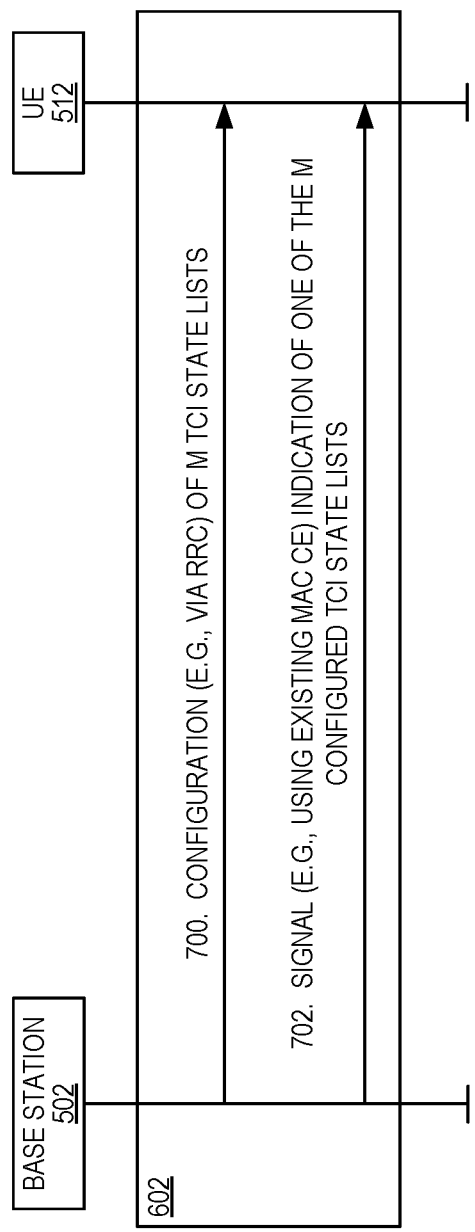
FIG. 7 illustrates step 600 of FIG. 6 in more detail for a first embodiment of the present disclosure.

FIG. 7 illustrates step 600 of FIG. 6 in more detail for the first embodiment. As illustrated, in regarding to the signaling of step 600, the base station 502 configures (e.g., via RRC signaling) the UE 512 with two or more TCI state lists, each having up to the maximum number of TCI states (step 700). The base station 502 transmits a MAC CE (e.g., a PDCCH MAC CE) to the UE 512, where the MAC CE includes an ID of one of the two or more TCI state lists to be activated (step 702). In the first embodiment, the MAC CE uses the existing MAC CE format (see FIG. 3), where the "TCI state ID" field is interpreted as the ID (e.g., tciListID in the example below) of the list of TCI states to be activated.

In one example implementation, the first embodiment may be implemented by the following additions to 3GPP TS 38.311 and 3GPP TS 38 321. The parts emphasized with bolded and underlined text are new additions.

\*\*\*\*\*Start Changes to 3GPP TS 38.311 and TS 38.321\*\*\*\*\*

```
Control ResourceSet ::= SEQUENCE {
    controlResourceSetId         ControlResourceSetId,
    frequencyDomainResources     BIT STRING (SIZE (45)),
    duration                     INTEGER (1..maxCoReSetDuration),
    cce-REG-MappingType          CHOICE {
        interleaved                  SEQUENCE {
            reg-BundleSize               ENUMERATED {n2, n3, n6},
            interleaverSize              ENUMERATED {n2, n3, n6},
            shiftIndex                   INTEGER(0..maxNrofPhysicalResourceBlocks-1)
OPTIONAL -- Need S
        },
        nonInterleaved               NULL
    },
    precoderGranularity          ENUMERATED {sameAsREG-bundle, allContiguousRBs},
    tci-StatesPDCCH-ToAddList    SEQUENCE(SIZE (1..maxNrofTCI-StatesPDCCH)) OF TCI-StateId
```

-continued

```
OPTIONAL, -- Cond NotSIBl-initialBWP
    tci-StatesPDCCH-ToReleaseList  SEQUENCE(SIZE (1..maxNrofTCI-StatesPDCCH)) OF TCI-StateId
OPTIONAL, -- Cond NotSIBl-initialBWP
    tci-PresentInDCI              ENUMERATED {enabled}   OPTIONAL, -- Need S
    pdcch-DMRS-ScramblingID       INTEGER (0..65535)     OPTIONAL, -- Need S
    ...,
    [[
    rb-Offset-r16                 INTEGER (0..5)    OPTIONAL, -- Need N
    tci-PresentInDCI-ForDCI-Formatl-2-r16  INTEGER (1..3)   OPTIONAL, -- Need S
    coresetPoolIndex-r16          INTEGER (0..1)    OPTIONAL, -- Need R
    controlResourceSetId-r16      ControlResourceSetId-r16   OPTIONAL -- Need S
    ]],
    [[
    tci-StatesListPDCCH           SEQUENCE(SIZE (1..maxNrofTCI-StatesListsPDCCH)) OF TCIList
OPTIONAL -- Cond NotSIBl-initialBWP
    ]]
}
TCIList ::= SEQUENCE{
    tciListID    INTEGER (1..maxNrofTCILists),
    tciList      SEQUENCE (SIZE (1.. maxNrofTCI-StatesPerPDCCH)) OF    TCI-StateId
}
maxNrofTCI-StatesListsPDCCH INTEGER ::= 128
maxNrofTCI-StatesPerListPDCCH INTEGER ::= 2
```

| ControlResourceSet field descriptions |
|---|
| cce-REG-MappingType |
| Mapping of Control Channel Elements (CCE) to Resource Element Groups (REG) (see TS 38.211 [16], clauses 7.3.2.2 and 7.4.1.3.2). |
| controlResourceSetId |
| Identifies the instance of the ControlResourceSet IE. Value 0 identifies the common CORESET configured in MIB and in ServingCellConfigCommon (controlResourceSetZero) and is hence not used here in the ControlResourceSet IE. Other values identify CORESETs configured by dedicated signalling or in SIB1. The controlResourceSetId is unique among the BWPs of a serving cell. If the field controlResourceSetId-r16 is present, the UE shall ignore the controlResourceSetId field (without suffix). |
| coresetPoolIndex |
| The index of the CORESET pool for this CORESET as specified in TS 38.213 [13] (clauses 9 and 10) and TS 38.214 [19] (clauses 5.1 and 6.1). If the field is absent, the UE applies the value 0. |
| duration |
| Contiguous time duration of the CORESET in number of symbols (see TS 38.211 [16], clause 7.3.2.2). |
| frequencyDomainResources |
| Frequency domain resources for the CORESET. Each bit corresponds a group of 6 RBs, with grouping starting from the first RB group (see TS 38.213 [13], clause 10.1) in the BWP. The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero (see TS 38.211 [16], clause 7.3.2.2). |
| interleaverSize |
| Interleaver-size (see TS 38.211 [16], clause 7.3.2.2). |
| pdcch-DMRS-ScramblingID |
| PDCCH DMRS scrambling initialization (see TS 38.211 [16], clause 7.4.1.3.1). When the field is absent the UE applies the value of the physCellId configured for this serving cell. |
| precoderGranularity |
| Precoder granularity in frequency domain (see TS 38.211 [16], clauses 7.3.2.2 and 7.4.1.3.2). |
| rb-Offset |
| Indicates the RB level offset in units of RB from the first RB of the first 6RB group to the first RB of BWP (see 38.213 [13], clause 10.1). When the field is absent, the UE applies the value 0. |
| reg-BundleSize |
| Resource Element Groups (REGs) can be bundled to create REG bundles. This parameter defines the size of such bundles (see TS 38.211 [16], clause 7.3.2.2). |
| shiftIndex |
| When the field is absent the UE applies the value of the physCellIdconfigured for this serving cell (see TS 38.211 [16], clause 7.3.2.2). |

| ControlResourceSet field descriptions |
| --- |
| tci-PresentInDCI |
| This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5). |
| tci-PresentInDCI-ForDCI-Format1-2 |
| Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5). |
| tci-StatesPDCCH-ToAddList |
| A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. |
| tci-StatesListPDCCH |
| A list of TCI states that are a subset of the TCI states defined in pdsch-Config included in the BWP-DownlinkDedicated corresponding to the serving cell and to the DL BWP to which the ControlResourceSet belong to. They are used for providing OCL relationships between the DL RS(s) in one RS Set (TCI-State) and the PDCCH DMRS ports (see TS 38.213 [13]. clause 6.) The network configures at most maxNrofTCI-StatesPDCCH entries. UE ignores tci-StatesPDCCH-ToAddList if tci-StatesListPDCCH is configured |

The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList-r16 or simultaneousTCI-UpdateListSecond-r16 as specified in TS 38.331 [5], this MAC CE applies to all the Serving Cells in the set simultaneousTCI-UpdateList-r16 or simultaneousTCI-UpdateListSecond-r16, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId or tciListID as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Confg in the active BWP. If the field of CORESET ID is set to the other value than 0 and UE is not configured with tci-StatesListPDCCH, this field indicates a TCI-StateIdconfigured by tci-StatesPDCCH-ToAddList and tci-StatesPDCCH-ToReleaseList in the controlResourceSet identified by the indicated CORESET ID. If the field of CORESET ID is set to the other value than 0 and UE is configured with tci-StatesListPDCCH, this field indicates a tciListID configured by tci-StatesListPDCCH in the controlResourceSet identified by the indicated CORESET ID. The length of the field is 7 bits.

Figure 3:
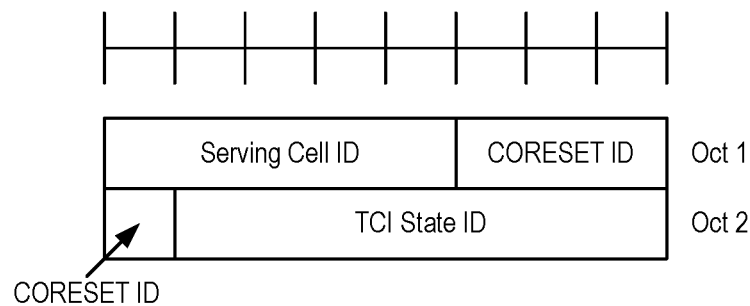
FIG. 3 is a reproduction of FIG. 6.1.3.15-1 of 3GPP Technical Specification (TS) 38.321.

Reproduced Herein as FIG. 3

FIG. 6.1.3.15-1: TCI State Indication for UE-Specific PDCCH MAC CE

\*\*\*\*\*End Changes to 3GPP TS 38.311 and TS 38.321\*\*\*\*\*

Second Embodiment—New MAC CE Options

In one embodiment, a new MAC CE is introduced to activate up to two TCI states to one CORESET ID as shown in FIG. 8. A "C" field is used to indicate which TCI state should be assumed by the UE 512 as default TCI state for PDSCH. If C=1 (or C=0), the default TCI state is the one in Octet 2; and, if C=0 (or C=1), the default TCI state is the one in Octet 3 which is the same octet where the C field is.

What is meant by default TCI state for PDSCH to be assumed by the UE 512 in this embodiment (and also in following embodiments) is the following. When the UE 512 assumes that the Demodulation Reference Signal (DMRS) ports of PDSCH of a serving cell are quasi co-located with the reference signal(s) (RS(s)) with respect to the QCL parameter(s) used for PDCCH quasi co-location indication in a CORESET, the default TCI state for PDSCH is the TCI state activated for PDCCH in the CORESET. For example, in NR Release 16 if none of the TCI codepoints in DCI for PDSCH scheduling are mapped to more than a single TCI state activated for PDSCH and the offset between the reception of a DL DCI and the corresponding PDSCH is less than a threshold timeDurationForQCL configured by higher layers, the UE may assume the default TCI state for receiving the PDSCH. The default TCI state in this case is the activated TCI state of the CORESET with the lowest CORESET-ID in the latest slot in which one or more CORESETs are monitored by the UE. In other word, the DMRS ports of the PDSCH are quasi co-located with RS(s) with respect to the QCL parameter(s) of the default TCI state in this case.

If the new MAC CE of the second embodiment is defined as fixed size MAC CE, by default the header does not include a length field. In this case, the MAC CE always activates two TCI states per CORESET. If this MAC CE is defined as flexible size MAC CE, the header will include a length field, and UE can interpret whether the MAC CE has one or two TCI states (two or three octets in the main body of the MAC CE) based on the length field.

In another embodiment, more than two TCI states can be mapped to one CORESET ID as shown in FIG. 9. In the example of FIG. 9, three TCI states are activated for one CORESET (i.e., the CORESET that corresponds to the given CORESET ID). One difference between this embodiment and that of FIG. 8 is that two or more bits are needed for the C field. The C field with 2 or more bits in this embodiment chooses which TCI states among the TCI states activated within the MAC CE should be used by the UE 512 as default TCI state for PDSCH.

In a further embodiment, the new MAC CE is as shown in FIG. 10, where up to N TCI states may be activated. If $C_k=1$, then TCI state $ID_k$ is the default TCI state for PDSCH. Only one $C_k$ can be set to 1. If $C_k=0$ for $k=1, \ldots, N-1$, then TCI state $ID_0$ is the default TCI state for PDSCH.

If this MAC CE is defined as fixed size MAC CE, by default the header does not include a length field. In this case, the MAC CE always activates two TCI states per CORESET. If this MAC CE is defined as flexible size MAC CE, the header will include a length field and UE can interpret whether the MAC CE has two TCI states or N TCI states (two or N octets in the main body of the MAC CE) based on the length field.

In some embodiments, only the first TCI state ID provided in the MAC CE is used as default TCI state for PDSCH. This means TCI state $ID_0$ (7 bits) in FIG. 8, FIG. 9, and FIG. 10 is used as default TCI state of PDSCH. The additional TCI states activated for a CORESET in the examples of FIG. 8, FIG. 9, and FIG. 10 are only used for the purpose of subsets of REs of a PDCCH candidate. In this embodiment, the 'C' field(s) are no longer needed as the default TCI state for PDSCH is already predefined by the first activated TCI state with TCI state $ID_0$. Hence, in this embodiment, the 'C' field(s) are replaced by reserved 'R' fields in FIG. 8, FIG. 9, and FIG. 10.

In some embodiments, the new MAC CE that provides more than one active TCI state per CORESET is only applicable to CORESETs other than CORESET 0 (i.e., a CORESET whose CORESET ID is set to a value other than 0).

In another embodiment, the number of CORESETs per serving cell is increased to larger than 16 (e.g., 20) which requires an additional bit to be included in the CORESET ID field. As shown in FIG. 11, CORESET ID is given by a 5-bit field where 3 bits are given in octet OCT1 and the remaining 2 bits are given in OCT2. For indicating the first activated TCI state for the CORESET, 6 out of 7 bits of TCI state $ID_0$ are provided in octet OCT2 and the remaining 1 bit of TCI state $ID_0$ is provided in octet OCT3. For indicating the second activated TCI state for the CORESET, the 7-bit TCI state $ID_1$ is provided in octet OCT3.

The above embodiments can be extended to the case where TCI state activation for more than one CORESET may be included in one MAC CE where one or two TCI states can be activated for each MAC CE. In this regard, FIG. 12 shows an example where TCI state activation for two CORESETs within the same serving cell are provided in the same MAC CE. Further details of this MAC CE design are given below:

The field CORESET $ID_r$ represents the CORESET ID of the $r^{th}$ CORESET for which TCI state(s) activation is provided in the MAC CE.

The field TCI state $ID_{r,i}$ represents the $i^{th}$ activated TCI state for the CORESET associated with CORESET $ID_r$.

The field $G_r$ is an indicator that indicates if TCI state activation for an additional CORESET (i.e., CORESET corresponding to CORESET $ID_{r+1}$) will be provided in the new MAC CE.

Note that, in one embodiment, in the above embodiments involving the introduction of a new MAC CE, each of the fields TCI state $ID_0$, TCI state $ID_1$, . . . indicate a TCI-StateIdconfigured by tci-StatesPDCCH-ToAddList and tci-StatesPDCCH-ToReleaseList in the controlResourceSet identified by the indicated CORESET ID.

Figure 13:
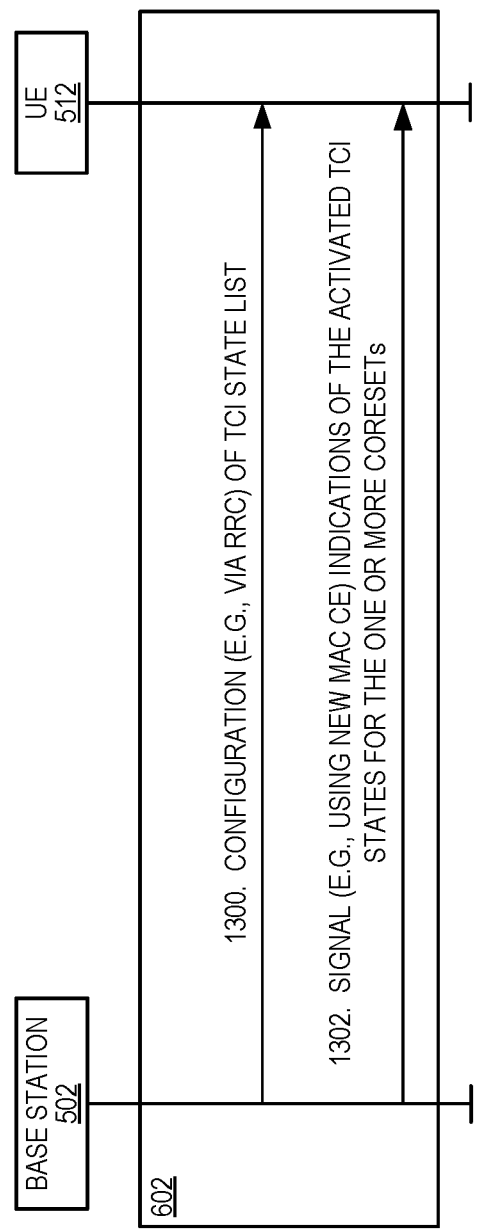
FIG. 13 illustrates step 600 of FIG. 6 in more detail for the second embodiment of the present disclosure.

FIG. 13 illustrates step 600 of FIG. 6 in more detail for the second embodiment. As illustrated, in regard to the signaling of step 600, the base station 502 may also configure (e.g., via RRC signaling) the UE 512 with a TCI state list having up to the maximum number of TCI states for each CORESET (step 1300). The base station 502 transmits a MAC CE (e.g., a PDCCH MAC CE) to the UE 512, where the MAC CE includes information that indicates the activated TCI states and, in some embodiments, the CORESET(s) for which the indicated TCI states are activated (step 1302). For example, the MAC CE may be the MAC CE of any one of FIGS. 8 to 12 described above. Note that the TCI state IDs included in the MAC CE may be indices of the TCI states in the TCI state list of the respective CORESET configured in step 1300.

Additional Details

Figure 14:
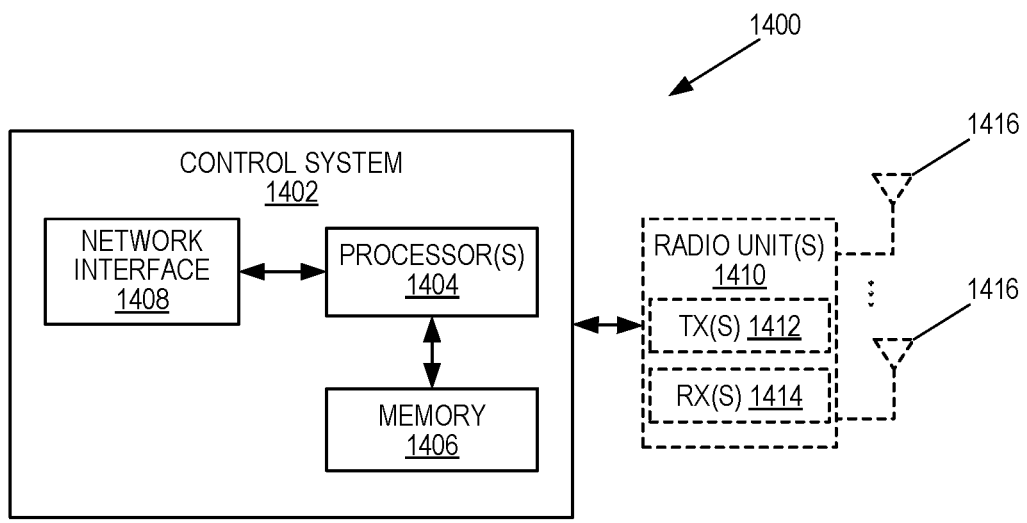
FIGS. 14, 15, and 16 are schematic block diagrams of example embodiments of a radio access node, or more generally a network node, in which embodiments of the present disclosure may be implemented.

FIG. 14 is a schematic block diagram of a radio access node 1400 according to some embodiments of the present disclosure. Optional features are represented by dashed boxes. The radio access node 1400 may be, for example, a base station 502, a low power node 506, a TRP (e.g., a TRP of a base station 502), or the like. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 may include one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of the radio access node 1400 as described herein (e.g., one or more functions of a base station 502, gNB, or TRP as described herein). In some embodiments, the function(s) are implemented in software that is stored, e.g., in the memory 1406 and executed by the one or more processors 1404.

Figure 15:
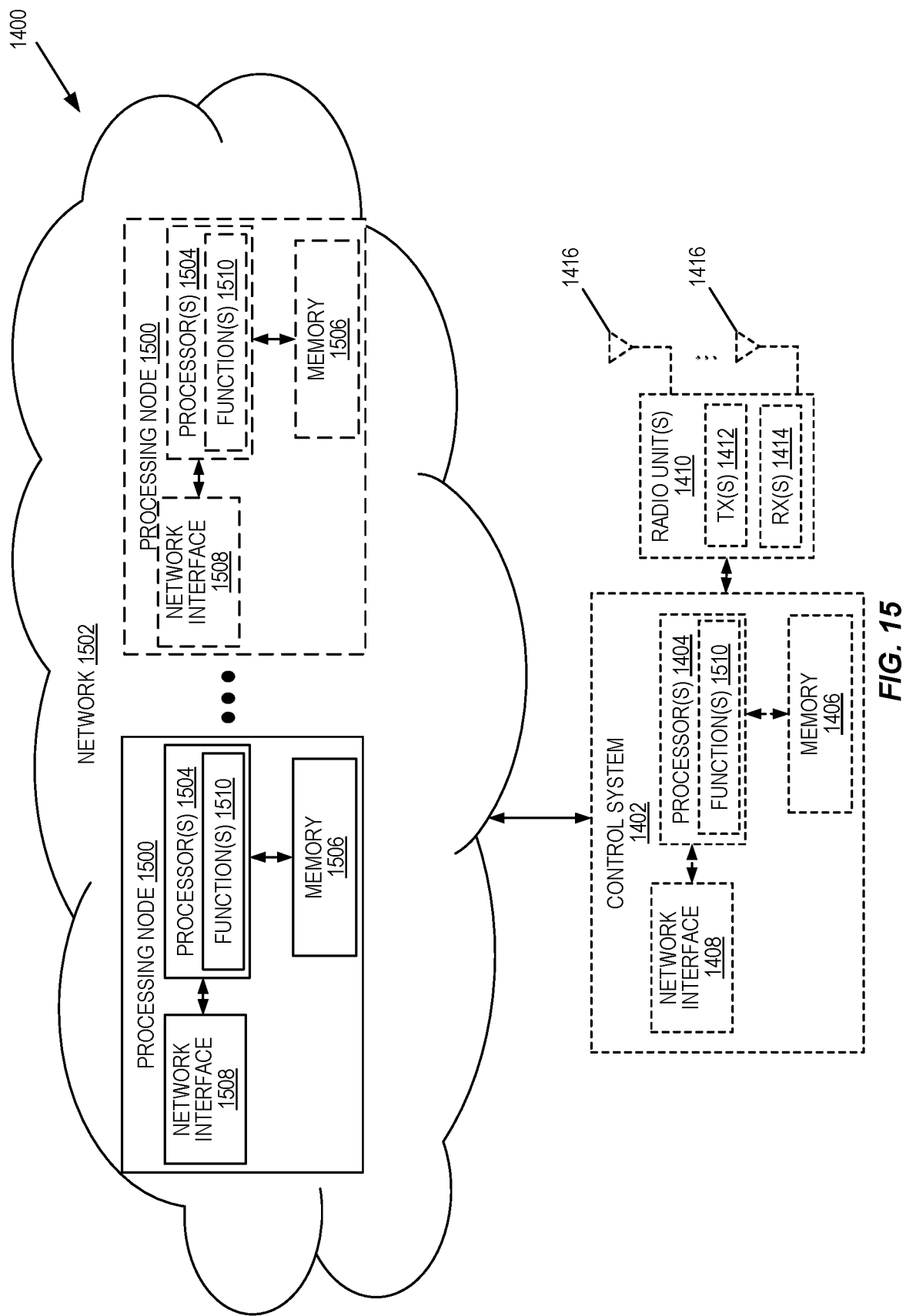

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node(s) in a network(s)). As illustrated, in this example, the radio access node 1400 may include the control system 1402 and/or the one or more radio units 1410, as described above. The control system 1402 may be connected to the radio unit(s) 1410 via, for example, an optical cable or the like. The radio access node 1400 includes one or more processing nodes 1500 coupled to or included as part of a network(s) 1502. If present, the control system 1402 or the radio unit(s) are connected to the processing node(s) 1500 via the network 1502. Each processing node 1500 includes one or more processors 1504 (e.g., CPUs, ASICs, FPGAs, and/or the like), memory 1506, and a network interface 1508.

In this example, functions 1510 of the radio access node 1400 described herein (e.g., one or more functions of a base station 502, gNB, or TRP as described herein) are implemented at the one or more processing nodes 1500 or distributed across the one or more processing nodes 1500 and the control system 1402 and/or the radio unit(s) 1410 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of the radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
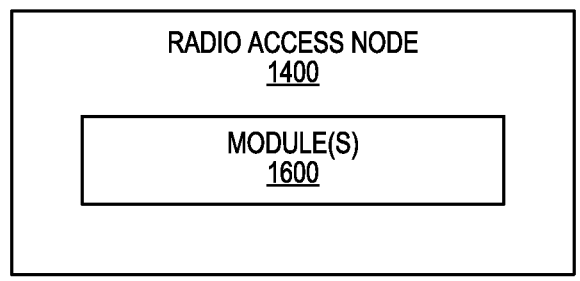

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein (e.g., one or more functions of a base station 502, gNB, or TRP as described herein). This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
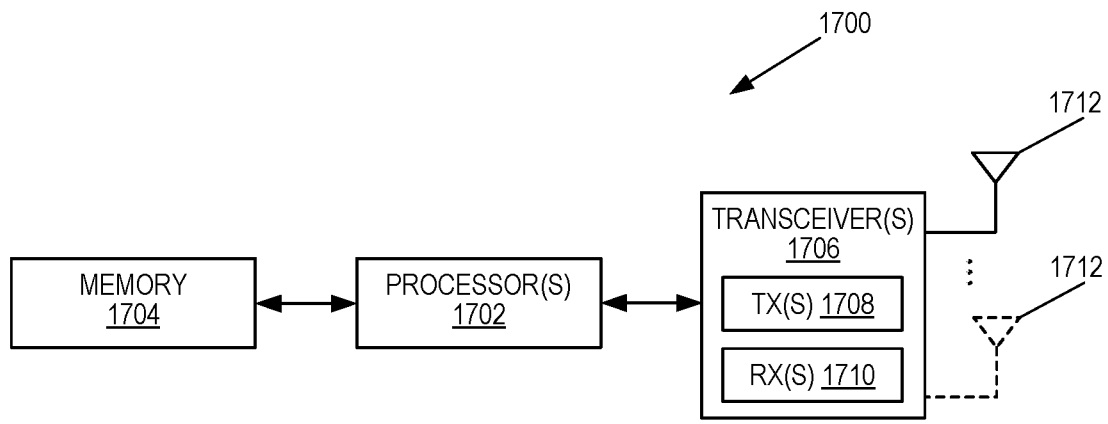
FIGS. 17 and 18 are schematic block diagrams of example embodiments of a wireless communication device (e.g., a UE) in which embodiments of the present disclosure may be implemented.

FIG. 17 is a schematic block diagram of a wireless communication device 1700 according to some embodiments of the present disclosure. The wireless communication device 1700 may be, for example, the wireless communication device or UE 512 as described herein. As illustrated, the wireless communication device 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the wireless communication device 1700 described above (e.g., one or more functions of the wireless communication device 512 or UE 512 described above) may be fully or partially implemented in software that is, e.g., stored in the memory 1704 and executed by the processor(s) 1702. Note that the wireless communication device 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the wireless communication device 1700 and/or allowing output of information from the wireless communication device 1700), a power supply (e.g., a battery and associated power circuitry), etc.

In some embodiments, a computer program including instructions which, when executed by at least one processor, causes the at least one processor to carry out the functionality of the wireless communication device 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
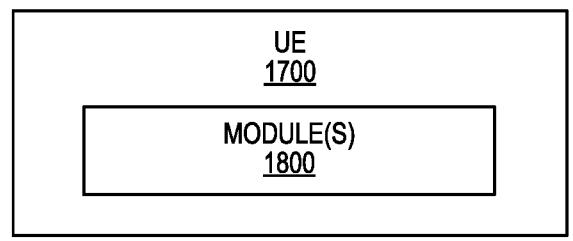

FIG. 18 is a schematic block diagram of the wireless communication device 1700 according to some other embodiments of the present disclosure. The wireless communication device 1700 includes one or more modules 1800, each of which is implemented in software. The module(s) 1800 provide the functionality of the wireless communication device 1700 described herein (e.g., one or more functions of the wireless communication device 512 or UE 512 described above).

Figure 19:
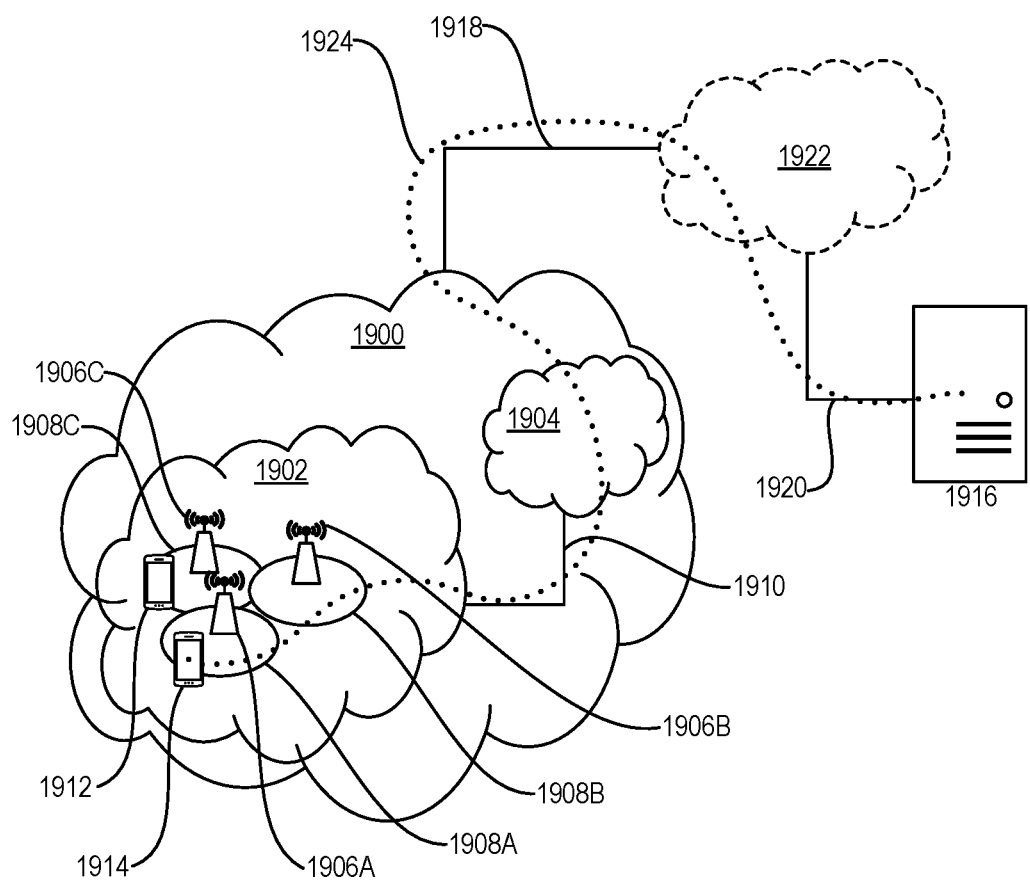
FIG. 19 illustrates an example embodiment of a communication system in which embodiments of the present disclosure may be implemented.

With reference to FIG. 19, in accordance with an embodiment, a communication system includes a telecommunication network 1900, such as a 3GPP-type cellular network, which comprises an access network 1902, such as a RAN, and a core network 1904. The access network 1902 comprises a plurality of base stations 1906A, 1906B, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
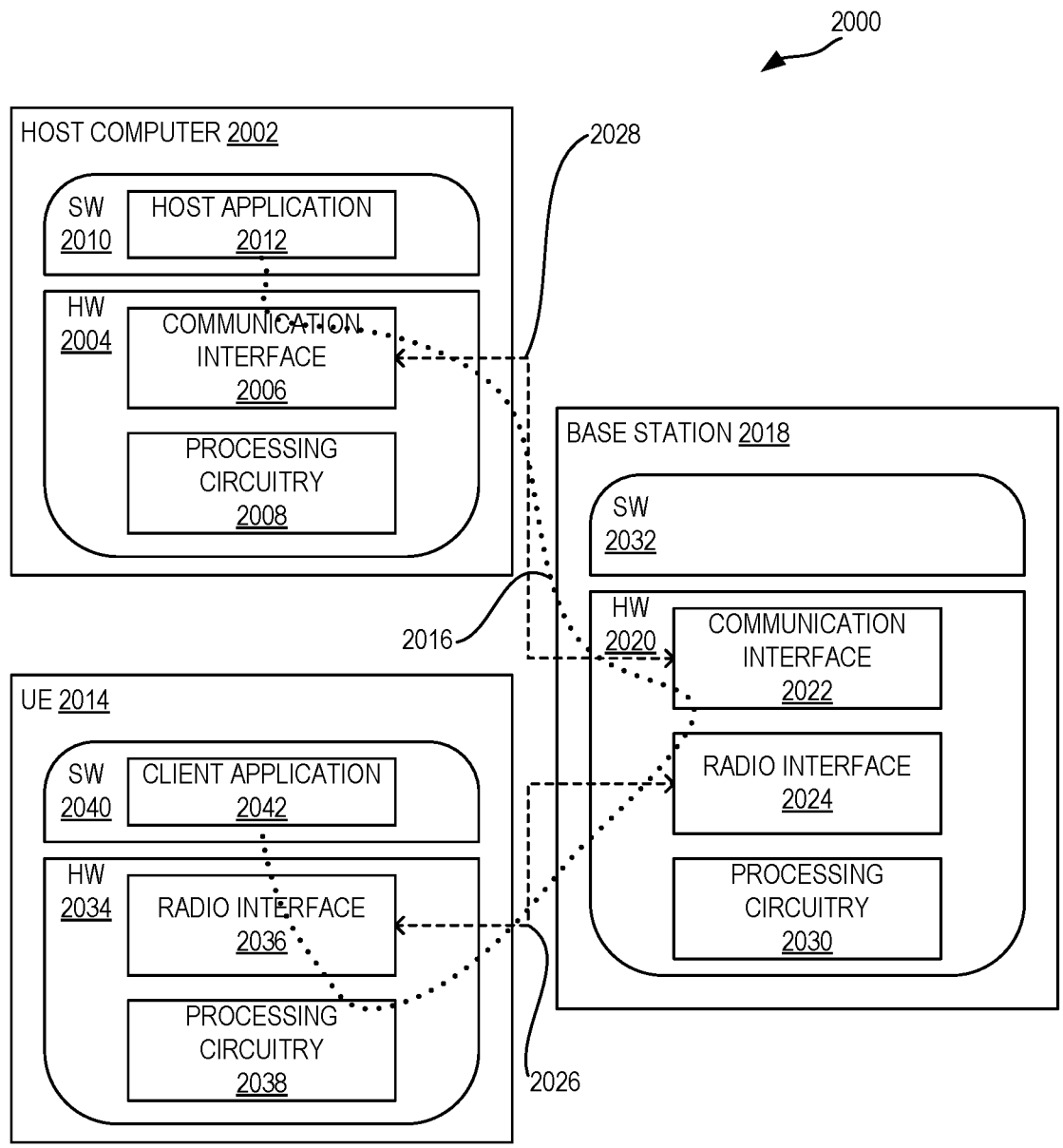
FIG. 20 illustrates example embodiments of the host computer, base station, and UE of FIG. 19.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve, e.g., reliability and thereby provide benefits such as, e.g., improved performance.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2018, and it may be unknown or imperceptible to the base station 2018. Such procedures and functionalities may be known and practiced in the art. In certain embodiments, measurements may involve proprietary UE signaling facilitating the host computer 2002's measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

Figures 23, 24:
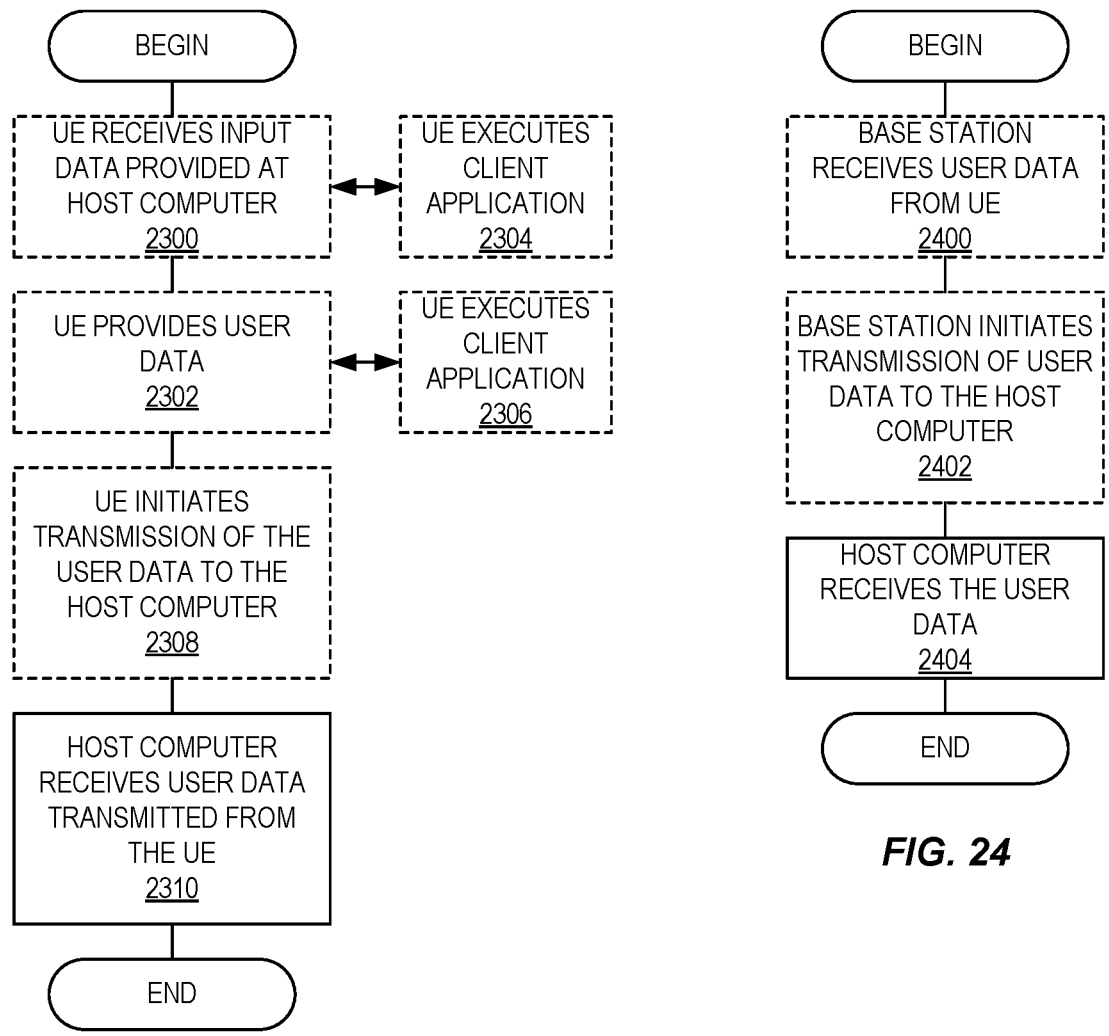

FIG. 23 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (512) for activation of multiple Transmission Configuration Indication, TCI, states for a Physical Downlink Control Channel, PDCCH, in one or more Control Resource Sets, CORESETs, in a cellular communications system (500), the method comprising: receiving (600), from a network node (502; 506; 1700), signaling that activates $N_{TCI}$ TCI states for one or more CORESETs, wherein $N_{TCI} > 1$.

Embodiment 2: The method of embodiment 1 further comprising receiving (602) PDCCHs in the one or more CORESETs in accordance with the $N_{TCI}$ TCI states that are activated for one or more CORESETs.

Embodiment 3: The method of embodiment 2 further comprising performing (604) one or more actions in accordance with downlink control information carried by the received PDCCHs.

Embodiment 4: The method of embodiment 2 or 3 wherein the received PDCCHs comprise two copies of a same DCI received from two or more respective transmission points, and the two or more respective transmission points correspond to two or more respective TCI states from among the $N_{TCI}$ TCI states that are activated for one or more CORESETs.

Embodiment 5: The method of embodiment 4 wherein the two copies of the same DCI are received from the two or more respective transmission points in a same CORESET.

Embodiment 6: The method of any one of embodiments 1 to 4 wherein the one or more CORESETs consist of a single CORESET, and the $N_{TCI}$ TCI states are activated for the single CORESET.

Embodiment 7: The method of any one of embodiments 1 to 4 wherein the one or more CORESETs comprise two or more CORESETs, and the signaling comprises, for each CORESET of the two or more CORESETs, information that indicates $N_{TCI}$ TCI states activated for the CORESET.

Embodiment 8: The method of embodiment 7 wherein $N_{TCI}$ is different for at least two of the two or more CORESETs.

Embodiment 9: The method of embodiment 7 wherein $N_{TCI}$ is the same for at least two of the two or more CORESETs.

Embodiment 10: The method of any one of embodiments 1 to 4 wherein receiving (600) the signaling that activates $N_{TCI}$ TCI states for one or more CORESETs comprises one or more of: receiving (700) a configuration of M TCI state lists for a CORESET, wherein each TCI state list of the M TCI state lists comprises up to a predefined or preconfigured maximum number of TCI states and M>1; and receiving (702), from the network node, an indication of one of the M TCI state lists for the CORESET, wherein TCI states in the one of the M TCI state lists are the $N_{TCI}$ TCI states that are activated for the CORESET.

Embodiment 11: The method of embodiment 10 wherein the predefined or preconfigured maximum number of TCI states is greater than or equal to 2.

Embodiment 12: The method of embodiment 10 or 11 wherein receiving (702) the indication of the one of the M TCI state lists for the CORESET comprises receiving a MAC CE that comprises the indication of the one of the M TCI state lists for the CORESET.

Embodiment 13: The method of embodiment 10 or 11 wherein receiving (702) the indication of the one of the M TCI state lists for the CORESET comprises receiving a MAC CE that comprises one or more of: a first octet that comprises a serving cell identity, ID, of a serving cell of the wireless communication device (512) and a first part of a CORESET ID of the CORESET; and a second octet that comprises a second part of the CORESET ID of the CORESET and a TCI state ID; wherein the wireless communication device (512) interprets the TCI state ID as the indication (e.g., index or ID) of the one of the M TCI state lists for the CORESET.

Embodiment 14: The method of any one of embodiments 10 to 13 wherein receiving (600) the signaling that activates $N_{TCI}$ TCI states for one or more CORESETs comprises: receiving (702), from the network node, a MAC CE that comprises, for each CORESET of the one or more CORESETs, information that indicates the $N_{TCI}$ TCI states that are activated for the CORESET.

Embodiment 15: The method of embodiment 14 wherein the one or more CORESETs consist of a single CORESET, and the MAC CE comprises, for each TCI state of the $N_{TCI}$ TCI states that are activated for the single CORESET, an indication (e.g., ID) of the TCI state.

Embodiment 16: The method of embodiment 15 wherein the MAC CE comprises one or more of: a first octet that comprises a serving cell identity, ID, of a serving cell of the wireless communication device (512) and a first part of a CORESET ID of the single CORESET; a second octet that comprises a second part of the CORESET ID of the single CORESET and a first TCI state ID of a first TCI state of the $N_{TCI}$ TCI states that are activated for the single CORESET; and a third octet that comprises a second TCI state ID of a second TCI state of the $N_{TCI}$ TCI states that are activated for the single CORESET.

Embodiment 17: The method of embodiment 16 wherein the MAC CE further comprises an indication of which of the $N_{TCI}$ TCI states that are activated for the single CORESET is a default TCI state for physical downlink shared channel, PDSCH.

Embodiment 18: The method of embodiment 16 wherein the first TCI state indicated by the first TCI state ID in the second octet of the MAC CE is a default TCI state for physical downlink shared channel, PDSCH.

Embodiment 19: The method of any of embodiments 15 to 18 wherein the MAC CE is a fixed size MAC CE.

Embodiment 20: The method of any of embodiments 15 to 18 wherein the MAC CE is a flexible size MAC CE, wherein a size of the MAC CE is indicated by a length field of an associated header and the wireless communication device (512) interprets a value of $N_{TCI}$ based on a value of the length field.

Embodiment 21: The method of embodiment 15 wherein the MAC CE comprises one or more of: a first octet that comprises a serving cell identity, ID, of a serving cell of the wireless communication device (512) and a first part of a CORESET ID of the single CORESET; a second octet that comprises a second part of the CORESET ID of the single CORESET and a first part of a TCI state ID of a first TCI state of the $N_{TCI}$ TCI states that are activated for the single CORESET; and a third octet that comprises a second part of the TCI state ID of the first TCI state of the $N_{TCI}$ TCI states that are activated for the single CORESET and a second TCI state ID of a second TCI state of the $N_{TCI}$ TCI states that are activated for the single CORESET.

Embodiment 22: The method of embodiment 15 wherein the MAC CE comprises one or more of: a first octet that comprises a serving cell identity, ID, of a serving cell of the wireless communication device (512) and a first part of a CORESET ID of the single CORESET; a second octet that comprises a second part of the CORESET ID of the single CORESET and a first TCI state ID of a first TCI state of the $N_{TCI}$ TCI states that are activated for the single CORESET; a third octet that comprises a second TCI state ID of a second TCI state of the $N_{TCI}$ TCI states that are activated for the single CORESET and a first part of a third TCI state ID of a third TCI state of the of the $N_{TCI}$ TCI states that are activated for the single CORESET; and a fourth octet that comprises a second part of the third TCI state ID of the third TCI state of the of the $N_{TCI}$ TCI states that are activated for the single CORESET.

Embodiment 23: The method of embodiment 22 wherein the MAC CE further comprises an indication of which of the $N_{TCI}$ TCI states that are activated for the single CORESET is a default TCI state for physical downlink shared channel, PDSCH.

Embodiment 24: The method of embodiment 22 wherein the first TCI state indicated by the first TCI state ID in the second octet of the MAC CE is a default TCI state for physical downlink shared channel, PDSCH.

Embodiment 25: The method of embodiment 15 wherein the MAC CE comprises one or more of:
  a first octet that comprises one or more of:
    a serving cell identity, ID, of a serving cell of the wireless communication device (512); and
    a first part of a CORESET ID of the single CORESET;
  a second octet that comprises one or more of:
    a second part of the CORESET ID of the single CORESET; and
    a first TCI state ID of a first TCI state of the $N_{TCI}$ TCI states that are activated for the single CORESET; and
  a third octet that comprises one or more of:
    an indication of whether a second TCI state of the $N_{TCI}$ TCI states that are activated for the single CORESET is a default TCI state for physical downlink shared channel, PDSCH; and
    a second TCI state ID of a second TCI state of the $N_{TCI}$ TCI states that are activated for the single CORESET.

Embodiment 26: The method of embodiment 25 wherein the MAC CE further comprises:
  a fourth octet that comprises one or more of:
    an indication of whether a third TCI state of the $N_{TCI}$ TCI states that are activated for the single CORESET is a default TCI state for physical downlink shared channel, PDSCH; and
    a third TCI state ID of the third TCI state of the of the $N_{TCI}$ TCI states that are activated for the single CORESET.

Embodiment 27: The method of embodiment 14 wherein the one or more CORESETs comprise two or more CORESETs, and the MAC CE comprises, for each CORESET of the two or more CORESETs,
  for each TCI state of the $N_{TCI}$ TCI states that are activated for the CORESET, an indication (e.g., ID) of the TCI state.

Embodiment 28: The method of embodiment 27 wherein the MAC CE comprises one or more of:
  a first octet that comprises one or more of:
    a serving cell identity, ID, of a serving cell of the wireless communication device (512); and
    a first part of a first CORESET ID of a first CORESET of the two or more CORESETs;
  a second octet that comprises one or more of:
    a second part of the first CORESET ID of the first CORESET; and
    a first TCI state ID of a first TCI state of the $N_{TCI}$ TCI states that are activated for the first CORESET; and
  a third octet that comprises one or more of:
    an indication of whether additional octets are present; and
    a second TCI state ID of a second TCI state of the $N_{TCI}$ TCI states that are activated for the first CORESET.

Embodiment 29: The method of embodiment 28 wherein the MAC CE further comprises one or more of:
  a first additional octet that comprises a second CORESET ID of a second CORESET of the two or more CORESETs;
  a second additional octet that comprises a first TCI state ID of a first TCI state of the $N_{TCI}$ TCI states that are activated for the second CORESET; and
  a third additional octet that comprises one or more of:
    an indication of whether additional octets are present; and
    a second TCI state ID of a second TCI state of the $N_{TCI}$ TCI states that are activated for the second CORESET.

Embodiment 30: A method performed by a wireless communication device (512) for activation of multiple Transmission Configuration Indication, TCI, states for a Physical Downlink Control Channel, PDCCH, in one or more Control Resource Sets, CORESETs, in a cellular communications system (500), the method comprising one or more of:
  receiving, from a network node (502; 506; 1700), a configuration of M TCI state lists, each comprising of two or more TCI states; and
  receiving an activation command carried by a MAC CE indicating one or more of:
    a TCI state list from the M TCI state lists if M>1; or
    a first and a second TCI states in the M TCI state lists if M=1 for PDCCH in the CORESET. (Note: For example, in the above disclosure, a case where a single list of TCI states is configured for a CORESET, a MAC CE is used to activate 2 or more TCI states from the list.)

Embodiment 31: The method of embodiment 30, wherein the MAC CE when M>1 is an existing MAC CE with its TCI state ID field being interpreted as an index or ID of a TCI state list.

Embodiment 32: The method of embodiment 30, wherein the MAC CE when M>1 consists of a first and a second TCI state IDs in a first and a second Octet for the first and the second TCI states, respectively.

Embodiment 33: The method of embodiment 30, wherein the MAC CE when M>1 further comprises a bit "C" field in a same Octet as the second TCI state ID to indicate one of the first and the second TCI states as a default TCI state for physical downlink shared channel, PDSCH.

Embodiment 34: The method of embodiment 30, wherein the method further comprises activating a third TCI state in the CORESET.

Embodiment 35: The method of embodiment 34, wherein the MAC CE when M>1 further comprises a third TCI state ID in a third octet for the third TCI state.

Embodiment 36: The method of embodiment 35, wherein the MAC CE when>1 further comprises of a "C" field in the third octet to indicate one of the first, the second, and the third TCI states as a default TCI state for physical downlink shared channel, PDSCH.

Embodiment 37: The methods of embodiment 35, wherein the MAC CE when M>1 further comprises a one bit "C" field in each of the second and the third octets to indicate one of the first, the second, and the third TCI states as a default TCI state for physical downlink shared channel, PDSCH.

Embodiment 38: The method of any of the previous embodiments, further comprising: providing user data; and forwarding the user data to a host computer via the transmission to the base station.

Group B Embodiments

Embodiment 39: A method performed by a network node (502) for activation of multiple Transmission Configuration Indication, TCI, states for a Physical Downlink Control Channel, PDCCH, in one or more Control Resource Sets, CORESETs, in a cellular communications system (500), the method comprising: sending (600), to a wireless communication device (512), signaling that activates $N_{TCI}$ TCI states for one or more CORESETs, wherein $N_{TCI}$>1.

Embodiment 40: The method of embodiment 39 wherein the one or more CORESETs consist of a single CORESET, and the $N_{TCI}$ TCI states are activated for the single CORESET.

Embodiment 41: The method of embodiment 39 wherein the one or more CORESETs comprise two or more CORESETs, and the signaling comprises, for each CORESET of the two or more CORESETs, information that indicates $N_{TCI}$ TCI states activated for the CORESET.

Embodiment 42: The method of embodiment 41 wherein $N_{TCI}$ is different for at least two of the two or more CORESETs.

Embodiment 43: The method of embodiment 41 wherein $N_{TCI}$ is the same for at least two of the two or more CORESETs.

Embodiment 44: The method of embodiment 39 wherein sending (600) the signaling that activates $N_{TCI}$ TCI states for one or more CORESETs comprises one or more of: sending (700), to the wireless communication device (512), a configuration of M TCI state lists for a CORESET, wherein each TCI state list of the M TCI state lists comprises up to a predefined or preconfigured maximum number of TCI states and M>1; and sending (702), to the wireless communication device (512), an indication of one of the M TCI state lists for the CORESET, wherein TCI states in the one of the M TCI state lists are the $N_{TCI}$ TCI states that are activated for the CORESET.

Embodiment 45: The method of embodiment 44 wherein the predefined or preconfigured maximum number of TCI states is greater than or equal to 2.

Embodiment 46: The method of embodiment 44 or 45 wherein sending (702) the indication of the one of the M TCI state lists for the CORESET comprises sending a MAC CE that comprises the indication of the one of the M TCI state lists for the CORESET.

Embodiment 47: The method of embodiment 44 or 45 wherein sending (702) the indication of the one of the M TCI state lists for the CORESET comprises sending a MAC CE that comprises one or more of: a first octet that comprises a serving cell identity, ID, of a serving cell of the wireless communication device (512) and a first part of a CORESET ID of the CORESET; and a second octet that comprises a second part of the CORESET ID of the CORESET and a TCI state ID; wherein the TCI state ID is interpreted as the indication (e.g., index or ID) of the one of the M TCI state lists for the CORESET.

Embodiment 48: The method of embodiment 39 wherein sending (600) the signaling that activates $N_{TCI}$ TCI states for one or more CORESETs comprises: sending (702), to the wireless communication device (512), a MAC CE that comprises, for each CORESET of the one or more CORESETs, indicates of the $N_{TCI}$ TCI states that are activated for the CORESET.

Embodiment 49: The method of embodiment 48 wherein the one or more CORESETs consist of a single CORESET, and the MAC CE comprises, for each TCI state of the $N_{TCI}$ TCI states that are activated for the single CORESET, an indication (e.g., ID) of the TCI state.

Embodiment 50: The method of embodiment 49 wherein the MAC CE comprises one or more of: a first octet that comprises a serving cell identity, ID, of a serving cell of the wireless communication device (512) and a first part of a CORESET ID of the single CORESET; a second octet that comprises a second part of the CORESET ID of the single CORESET and a first TCI state ID of a first TCI state of the $N_{TCI}$ TCI states that are activated for the single CORESET; and a third octet that comprises a second TCI state ID of a second TCI state of the $N_{TCI}$ TCI states that are activated for the single CORESET.

Embodiment 51: The method of embodiment 50 wherein the MAC CE further comprises an indication of which of the $N_{TCI}$ TCI states that are activated for the single CORESET is a default TCI state for physical downlink shared channel, PDSCH.

Embodiment 52: The method of embodiment 50 wherein the first TCI state indicated by the first TCI state ID in the second octet of the MAC CE is a default TCI state for physical downlink shared channel, PDSCH.

Embodiment 53: The method of any of embodiments 49 to 52 wherein the MAC CE is a fixed size MAC CE.

Embodiment 54: The method of any of embodiments 49 to 52 wherein the MAC CE is a flexible size MAC CE, wherein a size of the MAC CE is indicated by a length field of an associated header and the wireless communication device (512) interprets a value of $N_{TCI}$ based on a value of the length field.

Embodiment 55: The method of embodiment 49 wherein the MAC CE comprises one or more of: a first octet that comprises a serving cell identity, ID, of a serving cell of the wireless communication device (512) and a first part of a CORESET ID of the single CORESET; a second octet that comprises a second part of the CORESET ID of the single CORESET and a first part of a TCI state ID of a first TCI state of the $N_{TCI}$ TCI states that are activated for the single CORESET; and a third octet that comprises a second part of the TCI state ID of the first TCI state of the $N_{TCI}$ TCI states that are activated for the single CORESET and a second TCI state ID of a second TCI state of the $N_{TCI}$ TCI states that are activated for the single CORESET.

Embodiment 56: The method of embodiment 49 wherein the MAC CE comprises one or more of: a first octet that comprises a serving cell identity, ID, of a serving cell of the wireless communication device (512) and a first part of a CORESET ID of the single CORESET; a second octet that comprises a second part of the CORESET ID of the single CORESET and a first TCI state ID of a first TCI state of the $N_{TCI}$ TCI states that are activated for the single CORESET; a third octet that comprises a second TCI state ID of a second TCI state of the $N_{TCI}$ TCI states that are activated for the single CORESET and a first part of a third TCI state ID of a third TCI state of the of the $N_{TCI}$ TCI states that are activated for the single CORESET; and a fourth octet that comprises a second part of the third TCI state ID of the third TCI state of the of the $N_{TCI}$ TCI states that are activated for the single CORESET.

Embodiment 57: The method of embodiment 56 wherein the MAC CE further comprises an indication of which of the $N_{TCI}$ TCI states that are activated for the single CORESET is a default TCI state for physical downlink shared channel, PDSCH.

Embodiment 58: The method of embodiment 56 wherein the first TCI state indicated by the first TCI state ID in the second octet of the MAC CE is a default TCI state for physical downlink shared channel, PDSCH.

Embodiment 59: The method of embodiment 49 wherein the MAC CE comprises one or more of:
a first octet that comprises one or more of:
  a serving cell identity, ID, of a serving cell of the wireless communication device (512); and
  a first part of a CORESET ID of the single CORESET;
a second octet that comprises one or more of:
  a second part of the CORESET ID of the single CORESET; and
  a first TCI state ID of a first TCI state of the $N_{TCI}$ TCI states that are activated for the single CORESET; and
a third octet that comprises one or more of:
  an indication of whether a second TCI state of the $N_{TCI}$ TCI states that are activated for the single CORESET is a default TCI state for physical downlink shared channel, PDSCH; and
  a second TCI state ID of a second TCI state of the $N_{TCI}$ TCI states that are activated for the single CORESET.

Embodiment 60: The method of embodiment 59 wherein the MAC CE further comprises:
a fourth octet that comprises one or more of:
  an indication of whether a third TCI state of the $N_{TCI}$ TCI states that are activated for the single CORESET is a default TCI state for physical downlink shared channel, PDSCH; and
  a third TCI state ID of the third TCI state of the of the $N_{TCI}$ TCI states that are activated for the single CORESET.

Embodiment 61: The method of embodiment 48 wherein the one or more CORESETs comprise two or more CORESETs, and the MAC CE comprises, for CORESET of the two or more CORESETs,
for each TCI state of the $N_{TCI}$ TCI states that are activated for the CORESET, an indication (e.g., ID) of the TCI state.

Embodiment 62: The method of embodiment 61 wherein the MAC CE comprises one or more of:
a first octet that comprises one or more of:
  a serving cell identity, ID, of a serving cell of the wireless communication device (512); and
  a first part of a first CORESET ID of a first CORESET of the two or more CORESETs;
a second octet that comprises one or more of:
  a second part of the first CORESET ID of the first CORESET; and
  a first TCI state ID of a first TCI state of the $N_{TCI}$ TCI states that are activated for the first CORESET; and
a third octet that comprises one or more of:
  an indication of whether additional octets are present; and
  a second TCI state ID of a second TCI state of the $N_{TCI}$ TCI states that are activated for the first CORESET.

Embodiment 63: The method of embodiment 62 wherein the MAC CE further comprises one or more of:
a first additional octet that comprises a second CORESET ID of a second CORESET of the two or more CORESETs;
a second additional octet that comprises a first TCI state ID of a first TCI state of the $N_{TCI}$ TCI states that are activated for the second CORESET; and
a third octet that comprises one or more of:
  an indication of whether additional octets are present; and
  a second TCI state ID of a second TCI state of the $N_{TCI}$ TCI states that are activated for the second CORESET.

Embodiment 64: The method of any of the previous embodiments, further comprising: obtaining user data; and forwarding the user data to a host computer or a wireless communication device.

Group C Embodiments

Embodiment 65: A wireless communication device comprising: processing circuitry configured to perform any of the steps of any of the Group A embodiments; and power supply circuitry configured to supply power to the wireless communication device.

Embodiment 66: A base station comprising: processing circuitry configured to perform any of the steps of any of the Group B embodiments; and power supply circuitry configured to supply power to the base station.

Embodiment 67: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 68: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 69: The communication system of the previous embodiment further including the base station.

Embodiment 70: The communication system of the previous 2 embodiments, further including the UE, wherein the UE is configured to communicate with the base station.

Embodiment 71: The communication system of the previous 3 embodiments, wherein: the processing circuitry of the host computer is configured to execute a host application, thereby providing the user data; and the UE comprises processing circuitry configured to execute a client application associated with the host application.

Embodiment 72: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 73: The method of the previous embodiment, further comprising, at the base station, transmitting the user data.

Embodiment 74: The method of the previous 2 embodiments, wherein the user data is provided at the host computer by executing a host application, the method further comprising, at the UE, executing a client application associated with the host application.

Embodiment 75: A User Equipment, UE, configured to communicate with a base station, the UE comprising a radio interface and processing circuitry configured to perform the method of the previous 3 embodiments.

Embodiment 76: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 77: The communication system of the previous embodiment, wherein the cellular network further includes a base station configured to communicate with the UE.

Embodiment 78: The communication system of the previous 2 embodiments, wherein: the processing circuitry of the host computer is configured to execute a host application, thereby providing the user data; and the UE's processing circuitry is configured to execute a client application associated with the host application.

Embodiment 79: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 80: The method of the previous embodiment, further comprising at the UE, receiving the user data from the base station.

Embodiment 81: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 82: The communication system of the previous embodiment, further including the UE.

Embodiment 83: The communication system of the previous 2 embodiments, further including the base station, wherein the base station comprises a radio interface configured to communicate with the UE and a communication interface configured to forward to the host computer the user data carried by a transmission from the UE to the base station.

Embodiment 84: The communication system of the previous 3 embodiments, wherein: the processing circuitry of the host computer is configured to execute a host application; and the UE's processing circuitry is configured to execute a client application associated with the host application, thereby providing the user data.

Embodiment 85: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 86: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 87: The method of the previous embodiment, further comprising, at the UE, providing the user data to the base station.

Embodiment 88: The method of the previous 2 embodiments, further comprising: at the UE, executing a client application, thereby providing the user data to be transmitted; and at the host computer, executing a host application associated with the client application.

Embodiment 89: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 90: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 91: The communication system of the previous embodiment further including the base station.

Embodiment 92: The communication system of the previous 2 embodiments, further including the UE, wherein the UE is configured to communicate with the base station.

Embodiment 93: The communication system of the previous 3 embodiments, wherein: the processing circuitry of the host computer is configured to execute a host application; and the UE is configured to execute a client application associated with the host application, thereby providing the user data to be received by the host computer.

Embodiment 94: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 95: The method of the previous embodiment, further comprising at the base station, receiving the user data from the UE.

Embodiment 96: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless communication device for activation of multiple Transmission Configuration Indication, TCI, states for a Physical Downlink Control Channel, PDCCH, in one or more Control Resource Sets, CORESETs, in a cellular communications system, the method comprising:
 receiving, from a network node, a medium access control, MAC, control element, CE, signaling that activates two TCI states for one CORESET wherein the MAC CE signaling comprises:
  a first octet that comprises a serving cell identity, ID, of a serving cell of the wireless communication device and a first part of a CORESET ID of the one CORESET;
  a second octet that comprises a second part of the CORESET ID of the one CORESET and a first TCI state ID of a first TCI state of the two TCI states that are activated for the one CORESET; and
  a third octet that comprises a second TCI state ID of a second TCI state of the two TCI states that are activated for the one CORESET.

2. The method of claim 1, wherein the received PDCCHs comprise two copies of a same DCI received from two or more respective transmission points, and the two or more respective transmission points correspond to two or more respective TCI states from among the two TCI states that are activated for one or more CORESETs.

3. The method of claim 2, wherein the two copies of the same DCI are received from the two or more respective transmission points in a same CORESET.

4. The method of claim 1, wherein the one or more CORESETs consist of a single CORESET, and the two TCI states are activated for the single CORESET.

5. The method of claim 1, wherein receiving the MAC CE signaling that activates two TCI states for one CORESET comprises:
 receiving a configuration of M TCI state lists for the one CORESET, wherein each TCI state list of the M TCI state lists comprises up to a predefined or preconfigured maximum number of TCI states and M>1; and
 receiving, from the network node, an indication of one of the M TCI state lists for the one CORESET, wherein TCI states in the one of the M TCI state lists are the two TCI states that are activated for the one CORESET.

6. The method of claim 5, wherein receiving the indication of the one of the M TCI state lists for the CORESET comprises receiving a Medium Access Control, MAC, Control Element, CE, that comprises the indication of the one of the M TCI state lists for the CORESET.

7. The method of claim 5, wherein the wireless communication device interprets the TCI state ID as the indication of the one of the M TCI state lists for the CORESET.

8. The method of claim 5, wherein receiving the MAC CE signaling that activates two TCI states for one CORESET comprises:
 receiving, from the network node, a Medium Access Control, MAC, Control Element, CE, that comprises, for each CORESET of the one CORESET, information that indicates the two TCI states that are activated for the one CORESET.

9. The method of claim 1, wherein the first TCI state indicated by the first TCI state ID in the second octet of the MAC CE is a default TCI state for physical downlink shared channel, PDSCH.

10. The method of claim 1, wherein the MAC CE is a fixed size MAC CE.

11. The method of claim 1, wherein the third octet comprised in the MAC CE further comprises:
 a second part of the TCI state ID of the first TCI state of the two TCI states that are activated for the single CORESET.

12. The method of claim 1, wherein the one or more CORESETs comprise two or more CORESETs, and the MAC CE comprises, for each CORESET of the two or more CORESETs,
 for each TCI state of the two TCI states that are activated for the CORESET, an indication of the TCI state.

13. A method performed by a network node for activation of multiple Transmission Configuration Indication, TCI, states for a Physical Downlink Control Channel, PDCCH, in one or more Control Resource Sets, CORESETs, in a cellular communications system, the method comprising:
 sending, to a wireless communication device, a medium access control, MAC, control element, CE, signaling that activates two TCI states for one CORESET, wherein the MAC CE signaling comprises:
  a first octet that comprises a serving cell identity, ID, of a serving cell of the wireless communication device and a first part of a CORESET ID of the one CORESET;
  a second octet that comprises a second part of the CORESET ID of the one CORESET and a first TCI state ID of a first TCI state of the two TCI states that are activated for the one CORESET; and
  a third octet that comprises a second TCI state ID of a second TCI state of the two TCI states that are activated for the one CORESET.

14. The method of claim 13, wherein the two TCI states are activated for the one CORESET.

15. The method of claim 13, wherein the MAC CE signaling comprises, for the one CORESET, information that indicates two TCI states activated for the one CORESET.

16. The method of claim 15, wherein the two TCI states are different for at least two of the two or more CORESETs.

17. The method of claim 15, wherein the two TCI states are the same for at least two of the two or more CORESETs.

18. The method of claim 13, wherein sending the MAC CE signaling that activates two TCI states for one CORESET comprises:
 sending, to the wireless communication device, a configuration of M TCI state lists for the one CORESET, wherein each TCI state list of the M TCI state lists comprises up to a predefined or preconfigured maximum number of TCI states and M>1; and
 sending, to the wireless communication device, an indication of one of the M TCI state lists for the one CORESET, wherein TCI states in the one of the M TCI state lists are the two TCI states that are activated for the one CORESET.

19. The method of claim 13, wherein the MAC CE is a fixed size MAC CE.

20. The method of claim 13, wherein the third octet of the MAC CE comprises a second part of the TCI state ID of the first TCI state of the two TCI states that are activated for the single CORESET.

21. The method of claim 1, further comprising determining one of the first and the second TCI states as a default TCI state for physical downlink shared channel, PDSCH, scheduled by a physical control channel, PDCCH, received in the one CORESET.

\* \* \* \* \*